(12) United States Patent
Morii et al.

(10) Patent No.: US 11,740,074 B2
(45) Date of Patent: Aug. 29, 2023

(54) INNER SURFACE SHAPE MEASUREMENT DEVICE, AND ALIGNMENT METHOD FOR INNER SURFACE SHAPE MEASUREMENT DEVICE

(71) Applicant: Tokyo Seimitsu Co., Ltd., Tokyo (JP)

(72) Inventors: Hideki Morii, Tsuchiura (JP); Katsufumi Moriyama, Tsuchiura (JP); Hiroaki Kimura, Tsuchiura (JP)

(73) Assignee: TOKYO SEIMITSU CO., LTD., Tokyo (JP)

( * ) Notice: Subject to any disclaimer, the term of this patent is extended or adjusted under 35 U.S.C. 154(b) by 0 days.

(21) Appl. No.: 17/939,226

(22) Filed: Sep. 7, 2022

(65) Prior Publication Data

US 2023/0028748 A1 Jan. 26, 2023

Related U.S. Application Data

(63) Continuation of application No. PCT/JP2021/008943, filed on Mar. 8, 2021.

(30) Foreign Application Priority Data

Mar. 17, 2020 (JP) .................................. 2020-046503
Jan. 13, 2021 (JP) .................................. 2021-003449

(51) Int. Cl.
*G01B 11/24* (2006.01)
*G01B 11/00* (2006.01)
*G01B 11/26* (2006.01)

(52) U.S. Cl.
CPC ........ *G01B 11/2408* (2013.01); *G01B 11/002* (2013.01); *G01B 11/26* (2013.01)

(58) Field of Classification Search
CPC ..... G01B 11/002–11/007; G01B 11/12; G01B 11/2408; G01B 11/26–11/272; G01B 5/12; G01B 5/201; G01B 21/047
See application file for complete search history.

(56) References Cited

U.S. PATENT DOCUMENTS 5,134,781 A 8/1992 Baker
6,519,860 B1 2/2003 Bieg et al.
(Continued)

FOREIGN PATENT DOCUMENTS

JP 10-339623 A 12/1998
JP 2006-145344 A 6/2006
(Continued)

OTHER PUBLICATIONS

International Preliminary Report on Patentability, issued in PCT/JP2021/008942, PCT/IPEA/409, dated Apr. 19, 2022.
(Continued)

*Primary Examiner* — Michael P LaPage
(74) *Attorney, Agent, or Firm* — Birch, Stewart, Kolasch & Birch, LLP

(57) ABSTRACT

The following are observed using a camera: a first position of a small hole of a workpiece, which is fixed to a linear-and-tilting-motion stage and rotating with a rotating body, and a second position thereof different from the first position, at a first rotation angle of the rotating body; and the first position and the second position of the small hole of the workpiece at a second rotation angle different from the first rotation angle of the rotating body. A position and a tilt of the small hole are calculated from coordinates of the respective observed positions, and small hole information, which includes the position and the tilt of the small hole, is outputted.

20 Claims, 26 Drawing Sheets

(56) References Cited

U.S. PATENT DOCUMENTS

| | | | |
|---|---|---|---|
| 2006/0101660 A1 | 5/2006 | Takanashi | |
| 2016/0370172 A1* | 12/2016 | Christoph | .............. G01B 5/012 |
| 2017/0003113 A1 | 1/2017 | Pettersson et al. | |
| 2017/0191822 A1* | 7/2017 | Becker | ................ G01B 21/042 |
| 2017/0248411 A1 | 8/2017 | Yamazaki et al. | |
| 2017/0312875 A1 | 11/2017 | Kunihiro | |
| 2018/0018778 A1 | 1/2018 | Haverkamp et al. | |
| 2018/0096485 A1 | 4/2018 | Held | |
| 2018/0106595 A1* | 4/2018 | Christoph | ............ G01B 11/245 |
| 2019/0368855 A1 | 12/2019 | Morii | |

FOREIGN PATENT DOCUMENTS

| | | | |
|---|---|---|---|
| JP | 2008-292359 A | 12/2008 | |
| JP | 2011-174779 A | 9/2011 | |
| JP | 2018-84488 A | 5/2018 | |
| JP | 2018-163093 A | 10/2018 | |
| WO | WO 2016/084638 A1 | 6/2016 | |

OTHER PUBLICATIONS

International Search Report, issued in PCT/JP2021/008942, PCT/ISA/210, dated May 25, 2021.
International Search Report, issued in PCT/JP2021/008943, PCT/ISA/210, dated May 25, 2021.
Written Opinion of the International Preliminary Examining Authority, PCT/IPEA/408, issued in PCT/JP2021/008942, dated Dec. 21, 2021.
Written Opinion of the International Searching Authority, issued in PCT/JP2021/008942, PCT/ISA/237, dated May 25, 2021.
Written Opinion of the International Searching Authority, issued in PCT/JP2021/008943, PCT/ISA/237, dated May 25, 2021.
U.S. Office Action for U.S. Appl. No. 17/939,080, dated Jan. 3, 2023.
U.S. Notice of Allowance for U.S. Appl. No. 17/939,080, dated Apr. 12, 2023.
U.S. Corrected Notice of Allowance for U.S. Appl. No. 17/939,080, dated Apr. 26, 2023.

* cited by examiner

FIG.7
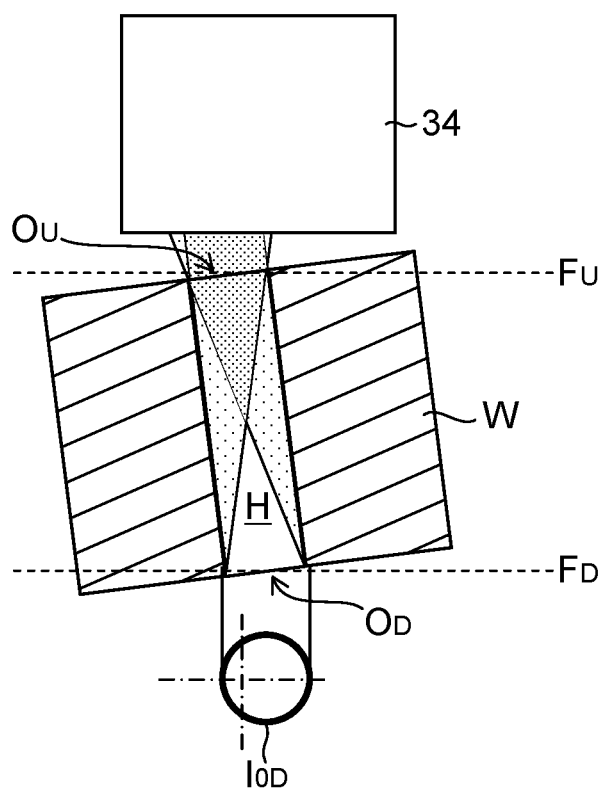
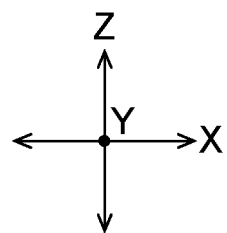

FIG.14
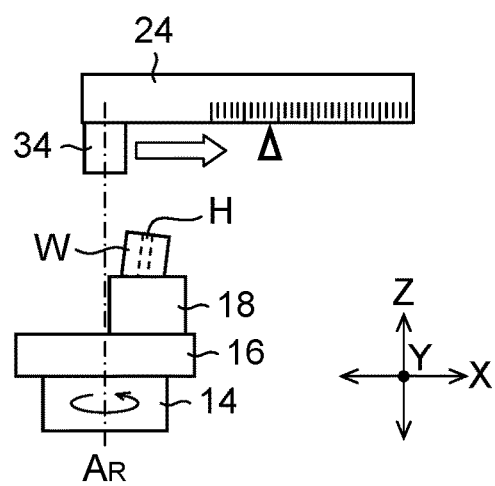
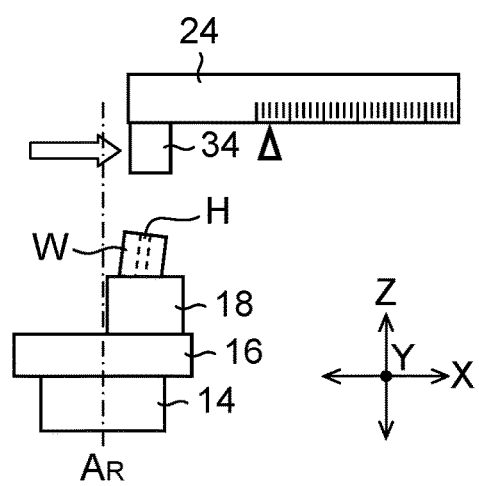
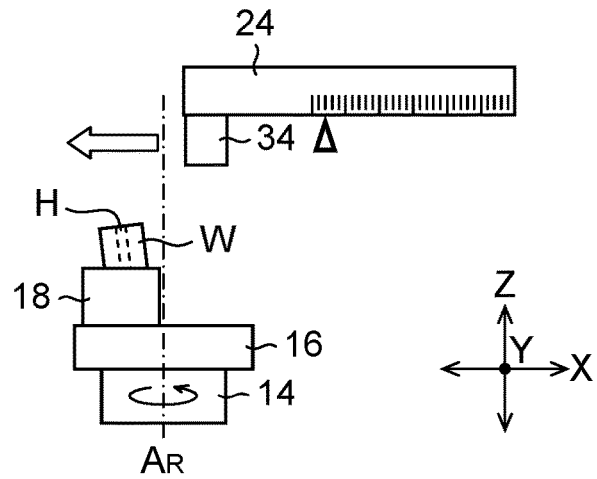
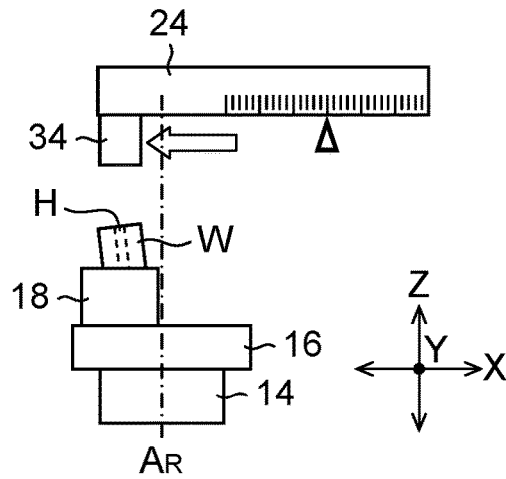

FIG.20
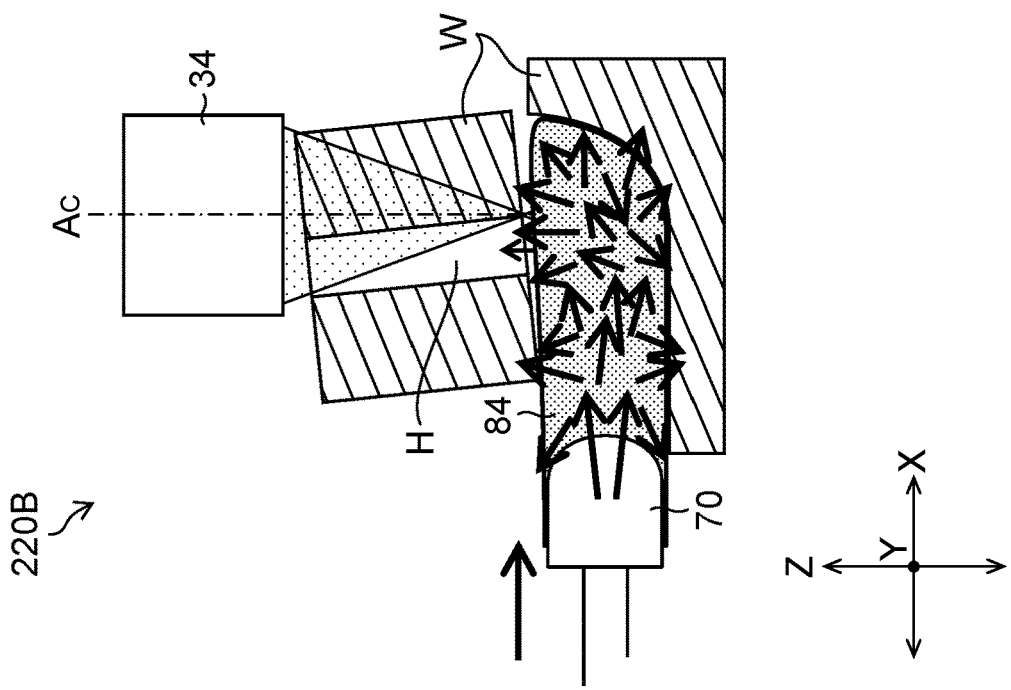
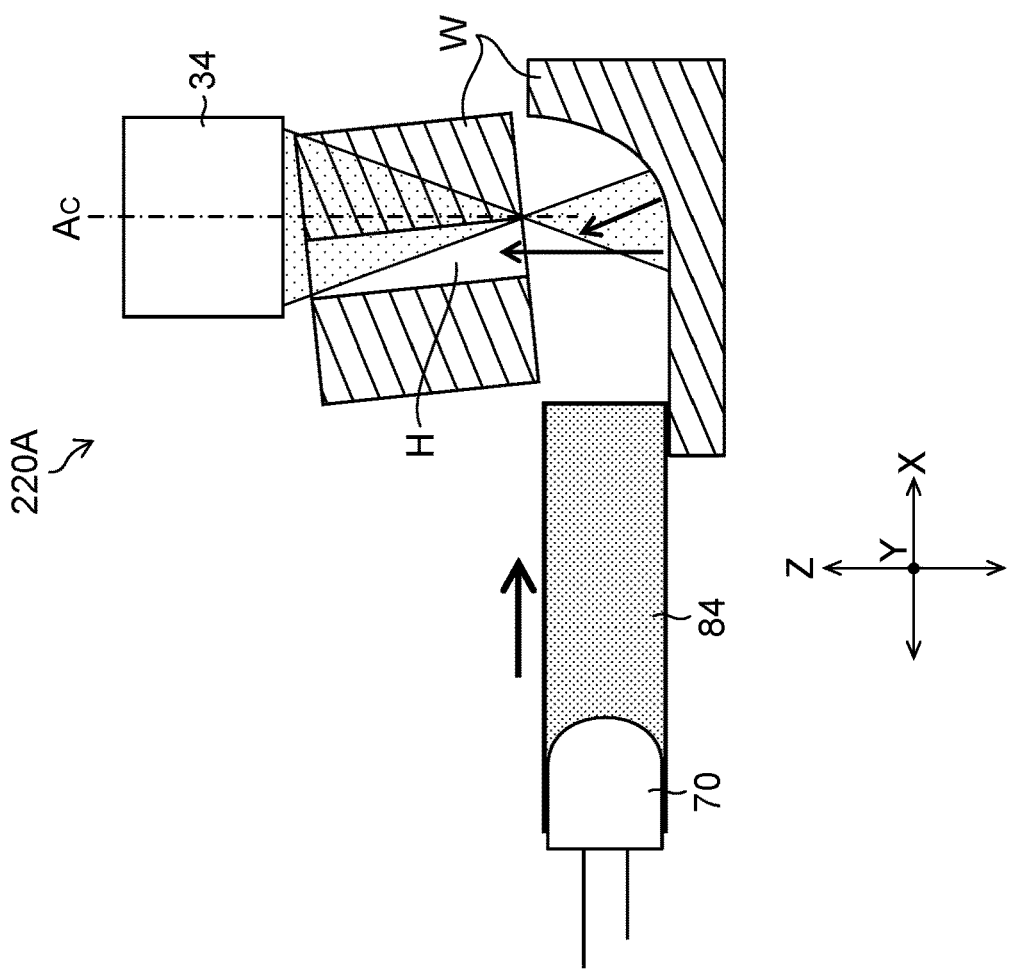

INNER SURFACE SHAPE MEASUREMENT DEVICE, AND ALIGNMENT METHOD FOR INNER SURFACE SHAPE MEASUREMENT DEVICE

CROSS-REFERENCE TO RELATED APPLICATIONS

The present application is a Continuation of PCT International Application No. PCT/JP2021/008943 filed on Mar. 8, 2021 claiming priority under 35 U.S.C § 119(a) to Japanese Patent Application No. 2020-046503 filed on Mar. 17, 2020 and Japanese Patent Application No. 2021-003449 filed on Jan. 13, 2021. Each of the above applications is hereby expressly incorporated by reference, in their entirety, into the present application.

BACKGROUND OF THE INVENTION

1. Field of the Invention

The present invention relates to a technique for measuring an inner surface shape of a small hole formed in a workpiece.

2. Description of the Related Art

In a shape measurement device that relatively moves a workpiece and a contact or non-contact probe to measure a shape of the workpiece, there is known an inner surface shape measurement device that rotates the workpiece around a rotation axis to measure a roundness of the workpiece. To measure the roundness with the inner surface shape measurement device, it is necessary to align the rotation axis with the axis of the workpiece.

Patent Literature 1 discloses a technique for bringing a contactor of a detector into contact with an inner circumference of a hole of a workpiece placed on a rotating table and thereby measuring a roundness of the hole. In the technique described in Patent Literature 1, the contactor of the detector is brought into contact with the outer peripheral surface of the workpiece in advance, a runout of the workpiece is observed at a low magnification while the rotating table is rotated, and the placement position of the workpiece is adjusted so that the runout is small.

Patent Literature 1: Japanese Patent Application Laid-Open No. 2006-145344

SUMMARY OF THE INVENTION

In measuring the inner surface shape of a small hole using an inner surface shape measurement device, there is a problem in alignment of the small hole. Specifically, when the probe is inserted into the small hole and the workpiece is rotated, there is a problem in which the probe collides with the hole wall.

On the other hand, when alignment is performed using the hole and a coaxial shape portion as in the technique described in Patent Literature 1, there is a limit to the shape of the object to be measured that can be measured.

In addition, when the worker inserts the probe while checking it with an observation microscope, the skill of the worker is required. In this case, automation is difficult, and the probe may collide with the hole wall due to an operation error.

The present invention has been made in view of such circumstances, and an object of the present invention is to provide an inner surface shape measurement device that properly aligns a position of a hole, and an alignment method for the inner surface shape measurement device.

One aspect of an inner surface shape measurement device for achieving the above object includes: a rotating body configured to rotate around a rotation axis parallel to a first direction; a linear-and-tilting-motion stage supported by the rotating body, the linear-and-tilting-motion stage being capable of changing a position thereof and a tilt thereof, the position being a position in a flat surface with respect to the rotating body, the tilt being a tilt with respect to the flat surface, the flat surface being orthogonal to the first direction; a displacement detector configured to detect displacement of an inner side surface of a small hole of a workpiece, using a probe capable of being moved in the first direction by a first linear-motion mechanism, the workpiece being fixed to the linear-and-tilting-motion stage and rotating together with the rotating body, the probe being a contact probe or a non-contact probe each extending parallel to the first direction; a camera having an optical axis parallel to the first direction; an observation controller configured to observe, using the camera: a first position and a second position of the small hole of the workpiece at a first rotation angle of the rotating body; and the first position and the second position of the small hole of the workpiece at a second rotation angle of the rotating body, the second position being a position different from the first position in the first direction, the second rotation angle being an angle different from the first rotation angle; a position-and-tilt calculator configured to calculate a position and a tilt of the small hole from coordinates of the observed first position and the observed second position of the small hole at the first rotation angle of the rotating body, and from coordinates of the observed first position and the observed second position of the small hole at the second rotation angle of the rotating body; and an output unit configured to output small hole information including the calculated position and tilt of the small hole.

It is preferable that the inner surface shape measurement device further includes a stage controller configured to control the linear-and-tilting-motion stage based on the small hole information, and make a deviation between a central axis of the small hole and the rotation axis within a target value. This makes it possible to automatically align the hole position.

It is preferable that: the camera can be moved in the first direction by the first linear-motion mechanism; and the observation controller moves a focal position of the camera to the first position and the second position of the small hole, using the first linear-motion mechanism. As a result, the camera can be properly focused on the first position and the second position of the small hole, so that the small hole can be properly observed by the camera.

One aspect of an inner surface shape measurement device for achieving the above object includes: a rotating body configured to rotate around a rotation axis parallel to a first direction; a linear-and-tilting-motion stage supported by the rotating body, the linear-and-tilting-motion stage being capable of changing a position thereof and a tilt thereof, the position being a position in a flat surface with respect to the rotating body, the tilt being a tilt with respect to the flat surface, the flat surface being orthogonal to the first direction; a displacement detector configured to detect displacement of an inner side surface of a small hole of a workpiece, using a probe capable of being moved in the first direction by a first linear-motion mechanism, the workpiece being fixed to the linear-and-tilting-motion stage and rotating together with the rotating body, the probe being a contact probe or a non-contact probe each extending parallel to the first direction; a camera having an optical axis parallel to the first direction; a first observation controller configured to observe, using the camera: a first position and a second position of a hole-shaped pattern of a reference workpiece at a first rotation angle of the rotating body; and the first position and the second position of the hole-shaped pattern of the reference workpiece at a second rotation angle of the rotating body, the second position being a position different from the first position in the first direction, the reference workpiece being fixed to the linear-and-tilting-motion stage, the reference workpiece being formed with the hole-shaped pattern and having a known shape, the second rotation angle being an angle different from the first rotation angle; a rotation center coordinate calculator configured to calculate rotation center coordinates of the rotating body from coordinates of the observed first position and the observed second position of the small hole at the first rotation angle of the rotating body, and from coordinates of the observed first position and the observed second position of the small hole at the second rotation angle of the rotating body; a second observation controller configured to observe a third position and a fourth position of the small hole of a workpiece to be measured, using a camera having an optical axis parallel to the first direction, the fourth position being different from the third position in the first direction, the workpiece to be measured being fixed to the linear-and-tilting-motion stage; and a position-and-tilt calculator configured to calculate a position and a tilt of the small hole from rotation center coordinates of the rotating body, and from the third position and the fourth position of the small hole.

According to each of the above aspects, the position of the hole can be properly aligned based on the small hole information. This is particularly effective for an extremely small diameter hole having an inner diameter of 500 μm or less.

It is preferable that the inner surface shape measurement device further includes a stage controller configured to control the linear-and-tilting-motion stage based on small hole information including a position and a tilt of the small hole, and make deviation between a central axis of the small hole and the rotation axis within a target value. This allows the hole positions to be automatically aligned.

It is preferable that: the camera can be moved in the first direction by the first linear-motion mechanism: and the second observation controller moves a focal position of the camera to the third position and the fourth position of the small hole, using the first linear-motion mechanism. As a result, the camera can be properly focused on the third position and the fourth position of the small hole, so that the small hole can be appropriately observed by the camera.

It is preferable that the first rotation angle and the second rotation angle are 180° different from each other. This makes it possible to accurately calculate the position and tilt of the small hole.

It is preferable that the inner surface shape measurement device further includes a coaxial illumination optical system configured to emit light coaxial with an optical axis of the camera. As a result, the small hole in the workpiece can be properly irradiated, so that the small hole can be properly observed by the camera.

It is preferable that the inner surface shape measurement device further includes a sponge-like reflector or a clay-like reflector, in which the reflector reflects light, incident on an opening on the camera side of the small hole of the workpiece, to the small hole at an opening on the linear-and-tilting-motion stage side, the workpiece being arranged between the camera and the linear-and-tilting-motion stage. This makes it possible to reflect the light, incident on the opening of the small hole of the workpiece on the camera side, to the small hole at the opening on the linear-and-tilting-motion stage side without damaging the work.

It is preferable that the inner surface shape measurement device further includes an open-cell structure having flexibility; and a light source configured to make light incident on the open-cell structure, in which the open-cell structure makes light from the light source incident on the opening on the linear-and-tilting-motion stage side of the small hole of the workpiece arranged between the camera and the linear-and-tilting-motion stage. As a result, light can be properly incident on the opening on the linear-and-tilting-motion stage side of the small hole of the workpiece.

An alignment method for an inner surface shape measurement device for achieving the above object is an alignment method for an inner surface shape measurement device, the inner surface shape measurement device including: a rotating body configured to rotate around a rotation axis parallel to a first direction; a linear-and-tilting-motion stage supported by the rotating body, the linear-and-tilting-motion stage being capable of changing a position thereof and a tilt thereof, the position being a position in a flat surface with respect to the rotating body, the tilt being a tilt with respect to the flat surface, the flat surface being orthogonal to the first direction; and a displacement detector configured to detect displacement of an inner side surface of a small hole of a workpiece, using a probe capable of being moved in the first direction by a first linear-motion mechanism, the workpiece being fixed to the linear-and-tilting-motion stage and rotating together with the rotating body, the probe being a contact probe or a non-contact probe each extending parallel to the first direction, the alignment method including: an observation control step of observing, using a camera having an optical axis parallel to the first direction: a first position and a second position of the small hole of the workpiece at a first rotation angle of the rotating body; and the first position and the second position of the small hole of the workpiece at a second rotation angle of the rotating body, the second position being a position different from the first position in the first direction, the second rotation angle being an angle different from the first rotation angle; a position-and-tilt calculation step of calculating a position and a tilt of the small hole from coordinates of the observed first position and the observed second position of the small hole at the first rotation angle of the rotating body, and from coordinates of the observed first position and the observed second position of the small hole at the second rotation angle of the rotating body; and an output step of outputting small hole information including the calculated position and tilt of the small hole.

An alignment method for an inner surface shape measurement device for achieving the above object is an alignment method for an inner surface shape measurement device, the inner surface shape measurement device including: a rotating body configured to rotate around a rotation axis parallel to a first direction; a linear-and-tilting-motion stage supported by the rotating body, the linear-and-tilting-motion stage being capable of changing a position thereof and a tilt thereof, the position being a position in a flat surface with respect to the rotating body, the tilt being a tilt with respect to the flat surface, the flat surface being orthogonal to the first direction; and a displacement detector configured to detect displacement of an inner side surface of a small hole of a workpiece to be measured, using a probe capable of being moved in the first direction by a first linear-motion mechanism, the workpiece being fixed to the linear-and-tilting-motion stage and rotating together with the rotating body, the probe being a contact probe or a non-contact probe each extending parallel to the first direction, the alignment method including: a first observation control step of fixing a reference workpiece to the linear-and-tilting-motion stage, and of observing, using a camera having an optical axis parallel to the first direction, a first position and a second position of a hole-shaped pattern of the reference workpiece at a first rotation angle of the rotating body; and the first position and the second position of the hole-shaped pattern of the reference workpiece at a second rotation angle of the rotating body, the second position being a position different from the first position in the first direction, the reference workpiece being formed with the hole-shaped pattern and having a known shape, the second rotation angle being an angle different from the first rotation angle; a rotation center coordinate calculation step of calculating rotation center coordinates of the rotating body from coordinates of the observed first position and the observed second position of the small hole at the first rotation angle of the rotating body, and from coordinates of the observed first position and the observed second position of the small hole at the second rotation angle of the rotating body; a second observation control step of fixing the workpiece to be measured to the linear-and-tilting-motion stage, and of observing a third position and a fourth position of the small hole of the workpiece to be measured, using a camera having an optical axis parallel to the first direction, the fourth position being different from the third position in the first direction; and a position-and-tilt calculation step of calculating a position and a tilt of the small hole from rotation center coordinates of the rotating body, and from the third position and the fourth position of the small hole of the rotating body.

According to this aspect, the position of the hole can be properly aligned based on the small hole information. This is particularly effective for an extremely small diameter hole having an inner diameter of 500 µm or less.

According to the present invention, the position of the hole can be properly aligned.

BRIEF DESCRIPTION OF THE DRAWINGS

FIG. 7 is a schematic diagram illustrating observation of a lower opening of the small hole using the camera;

FIG. 14 is a schematic diagram illustrating observation of the small hole using the camera when a position of the small hole of the workpiece is largely deviated from the rotation axis;

FIG. 20 is a diagram illustrating insertion of a scatterer into the lower opening side of the small hole in the workpiece;

DESCRIPTION OF THE EMBODIMENTS

The following describes preferred embodiments of the present invention in detail with reference to the accompanying drawings.

<Configuration of Inner Surface Shape Measurement Device>

Figure 1:
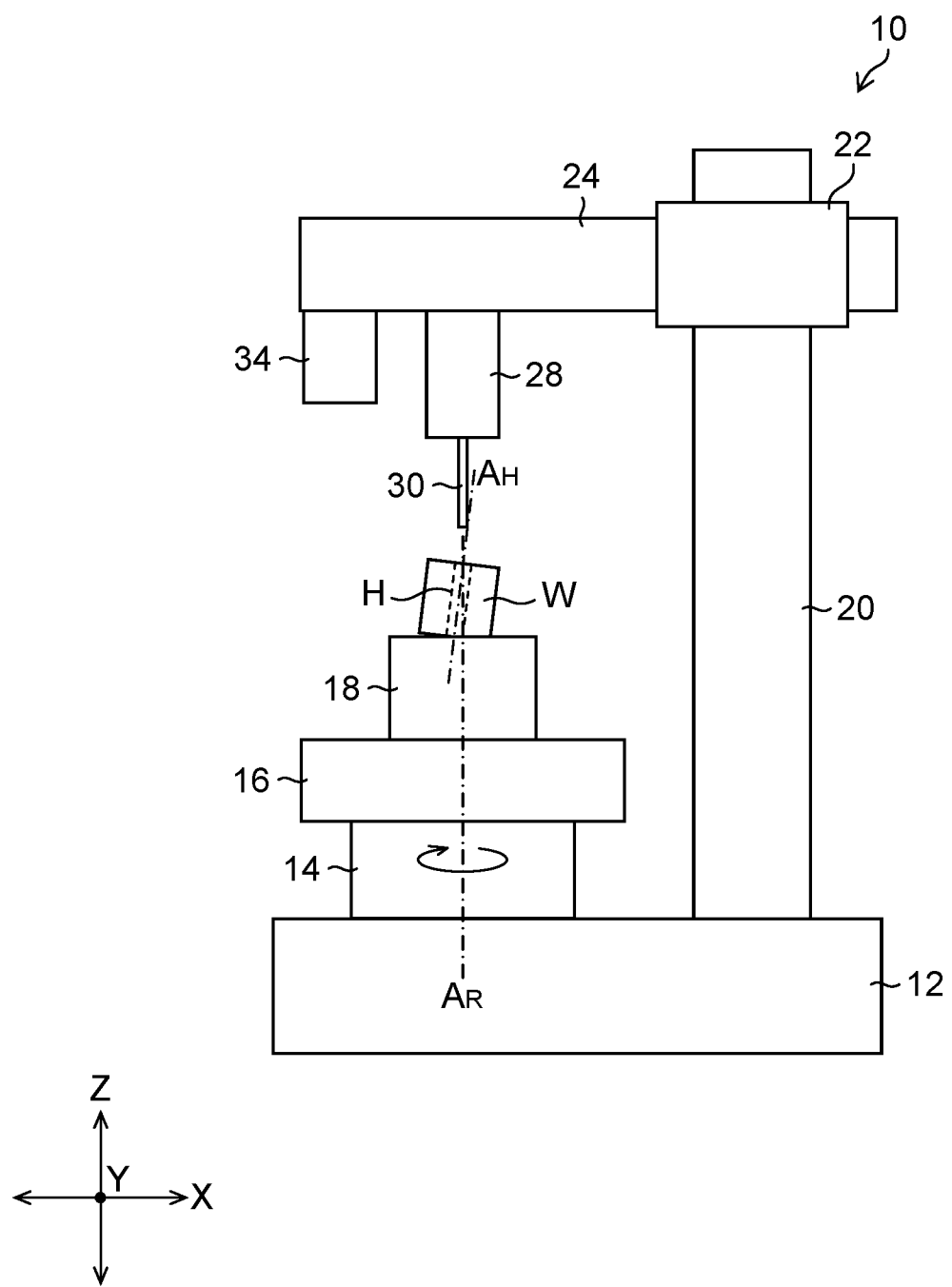
FIG. 1 is a schematic diagram illustrating a configuration of an inner surface shape measurement device.

FIG. 1 is a schematic diagram illustrating a configuration of an inner surface shape measurement device 10 according to the present embodiment. The inner surface shape measurement device 10 measures an inner surface shape (roundness, etc.) of a small hole H formed in a workpiece W. In this example, the small hole H is a small hole formed along the central axis of the workpiece W. The inner diameter of the small hole H is an extremely small diameter (for example, the inner diameter is 500 μm or less). In FIG. 1, an X direction, a Y direction, and a Z direction are directions orthogonal to each other, the X direction is the horizontal direction, the Y direction is the horizontal direction orthogonal to the X direction, and the Z direction is the vertical direction.

As illustrated in FIG. 1, the inner surface shape measurement device 10 includes a main body base 12, a rotating body 14, a linear-and-tilting-motion stage 16, a workpiece installation jig 18, a column 20, a carriage 22, an arm 24, a displacement detector 28, and a camera 34.

The rotating body 14 is fixed on the main body base 12. Inside the main body base 12, there are provided a motor (not illustrated) connected to the rotating body 14, an encoder (not illustrated), and a high-accuracy rotation mechanism (not illustrated). The rotating body 14 is driven by the motor to rotate with high accuracy around a rotation axis $A_R$ parallel to the Z direction (an example of a first direction). Further, the rotation angle of the rotating body 14 is detected by the rotation angle signal output from the encoder.

The linear-and-tilting-motion stage 16 (an example of a linear-and-tilting-motion stage) is supported by the rotating body 14 so as to be relatively movable with respect to the rotating body 14. The linear-and-tilting-motion stage 16 are driven by a motor (not illustrated) to move in parallel to the X and Y directions, and can change the position of the workpiece W fixed to the linear-and-tilting-motion stage 16 in the flat surface orthogonal to the Z direction (in the XY plane). Further, the linear-and-tilting-motion stage 16 is driven by a motor (not illustrated) to tilt with respect to the X direction and the Y direction, and can change the tilt of the workpiece W fixed to the linear-and-tilting-motion stage 16 with respect to the XY plane.

The workpiece installation jig 18 is placed on the linear-and-tilting-motion stage 16. The workpiece W is installed on the workpiece installation jig 18. In other words, the workpiece W is fixed to the linear-and-tilting-motion stage 16 via the workpiece installation jig 18. The workpiece W has a small hole H having an extremely small diameter. The small hole H penetrates the inside of the workpiece W straight from the upper opening $O_U$ (see FIG. 5) to the lower opening $O_D$ (see FIG. 7).

To measure the inner surface shape such as the roundness of the small hole H of the workpiece W in the inner surface shape measurement device 10, it is necessary to align the workpiece W so that the central axis $A_H$ of the small hole H of the workpiece W is coaxial with the rotation axis $A_R$ of the rotating body 14. The alignment of the workpiece W is to be described below. FIG. 1 illustrates a state before the alignment of the workpiece W. The aligned workpiece W rotates around the rotation axis $A_R$ together with the rotating body 14.

Further, a column (post) 20 extending in parallel to the Z direction is erected on the main body base 12. The lower end portion of the column 20 is fixed to the upper surface of the main body base 12.

The carriage 22 is supported by the column 20 so as to be movable in the Z direction. The carriage 22 is driven by a motor (not illustrated) to move in the Z direction. The carriage 22 corresponds to a vertical linear-motion mechanism (an example of a first linear-motion mechanism) for moving the displacement detector 28 and the camera 34 in the Z direction.

The arm 24 is supported by the carriage 22 so as to be movable in the X direction (an example of a direction orthogonal to the first direction). The arm 24 is driven by a motor (not illustrated) to move in the X direction. The arm 24 corresponds to a horizontal linear-motion mechanism for moving the displacement detector 28 and the camera 34 in the X direction.

The displacement detector 28 is supported by the arm 24. The displacement detector 28 includes a non-contact or contact probe 30.

Figure 2:
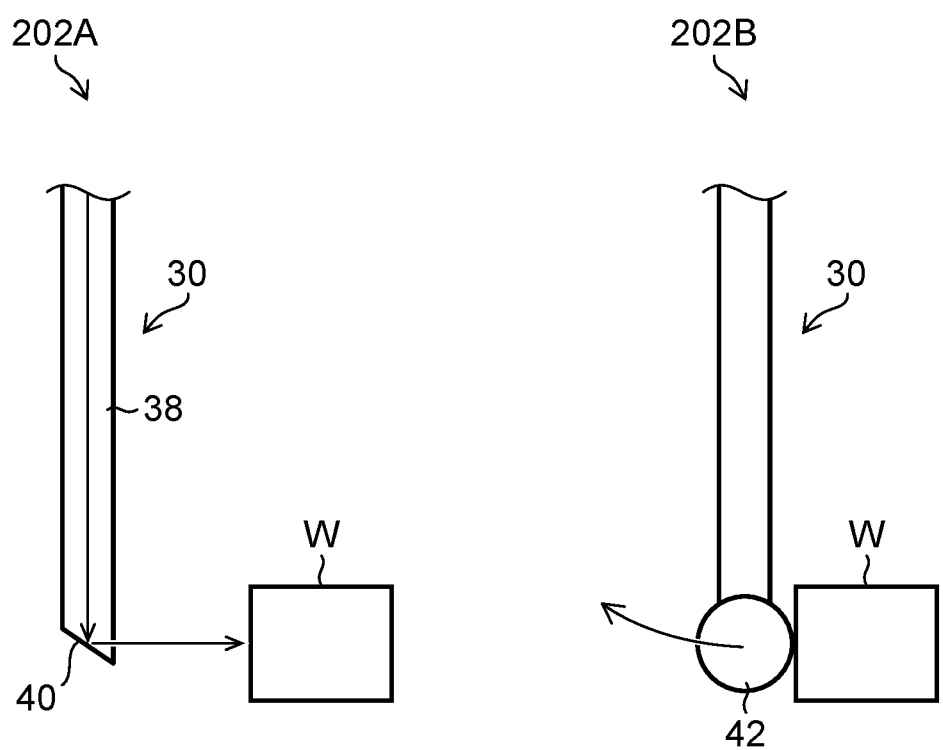
FIG. 2 is a schematic diagram illustrating an example of a non-contact probe and a contact probe.

FIG. 2 is a schematic diagram illustrating an example of the probe 30. In 202A in FIG. 2, a non-contact probe 30 is illustrated. The displacement detector 28 (see FIG. 1) including the non-contact probe 30 includes: a light emitting element (not illustrated) that emits detection light; and a light receiving element (not illustrated) that receives the reflected light of the detection light emitted from the light emitting element. The non-contact probe 30 includes an optical fiber 38 and a reflective mirror 40. The light emitted from the light emitting element (not illustrated) of the displacement detector 28 (see FIG. 1) is guided by the optical fiber 38 to the reflective mirror 40, reflected by the reflective surface of the reflective mirror 40, and incident on the workpiece W. The reflected light reflected by the workpiece W is incident on the reflective mirror 40, reflected on the reflective surface of the reflective mirror 40, and guided to the optical fiber 38. The reflected light guided to the optical fiber 38 is input to a light receiving element (not illustrated) of the displacement detector 28. The displacement detector 28 detects the displacement of the workpiece W based on the reflected light received by the light receiving element.

Techniques of the non-contact type displacement detectors 28 to be applied can be known methods such as a laser interferometer, a white interferometer, an SD-OCT (Spectral Domain-Optical Coherence Tomography), and an SS-OCT (Swept Source-Optical Coherence Tomography).

Note that the displacement detector 28 may detect the displacement of the workpiece W by a contact type. In 202B in FIG. 2, a contact probe 30 is illustrated. The contact probe 30 includes a contactor 42 at its end that is urged toward the workpiece W. When the contactor 42 comes into contact with the workpiece W, the contactor 42 is displaced according to the shape of the workpiece W. The displacement of the contactor 42 is transmitted to the displacement detector 28 via the probe 30. The displacement detector 28 detects the displacement of the workpiece W based on the displacement of the contactor 42.

Displacement detection mechanisms of the contact type displacement detectors 28 to be applied can be known mechanisms such as a LVDT (Linear Variable Differential Transformer), an interferometer, an optical triangulation method, and a thin film strain measurement. Further, the displacement detector 28 may use a method using a fact in which the contactor 42 is vibrated at the resonance frequency and then the contact changes the resonance point.

Returning to the description of FIG. 1, when the inner surface shape measurement device 10 measures the roundness of the small hole H of the workpiece W, the probe 30 is moved in the Z direction together with the displacement detector 28 by the carriage 22, and inserted into the small hole H of the workpiece W. The displacement detector 28 detects the displacement of the hole wall (inner side surface) of the small hole H using the probe 30.

The camera 34 is supported by the arm 24 with the optical axis $A_C$ (see FIG. 12) parallel and downward in the Z direction.

The camera 34 includes: a coaxial epi-illumination optical system 35 (see FIG. 3, an example of a coaxial illumination optical system); and a magnifying optical system (microscope, not illustrated) that magnifies and projects an object to be observed. The coaxial epi-illumination optical system 35 includes an illumination light source (not illustrated) and a half mirror (not illustrated) that emits light from the illumination light source as illumination light coaxial with the optical axis $A_C$ of the camera 34. The camera 34 can irradiate an object to be observed with illumination light coaxially with the optical axis $A_C$ of the camera and take an enlarged image of the object to be observed. Although coaxial epi-illumination is used here, oblique lighting may be used.

The inner surface shape measurement device 10 configured in this way aligns the workpiece W, inserts the probe 30 into the small hole H of the workpiece W, rotates the rotating body 14 to relatively move the workpiece W and the probe 30, detects the displacement of the hole wall of the small hole H with the displacement detector 28, and thereby can measure the roundness of the small hole H.

<Electrical Configuration of Inner Surface Shape Measurement Device>

Figure 3:
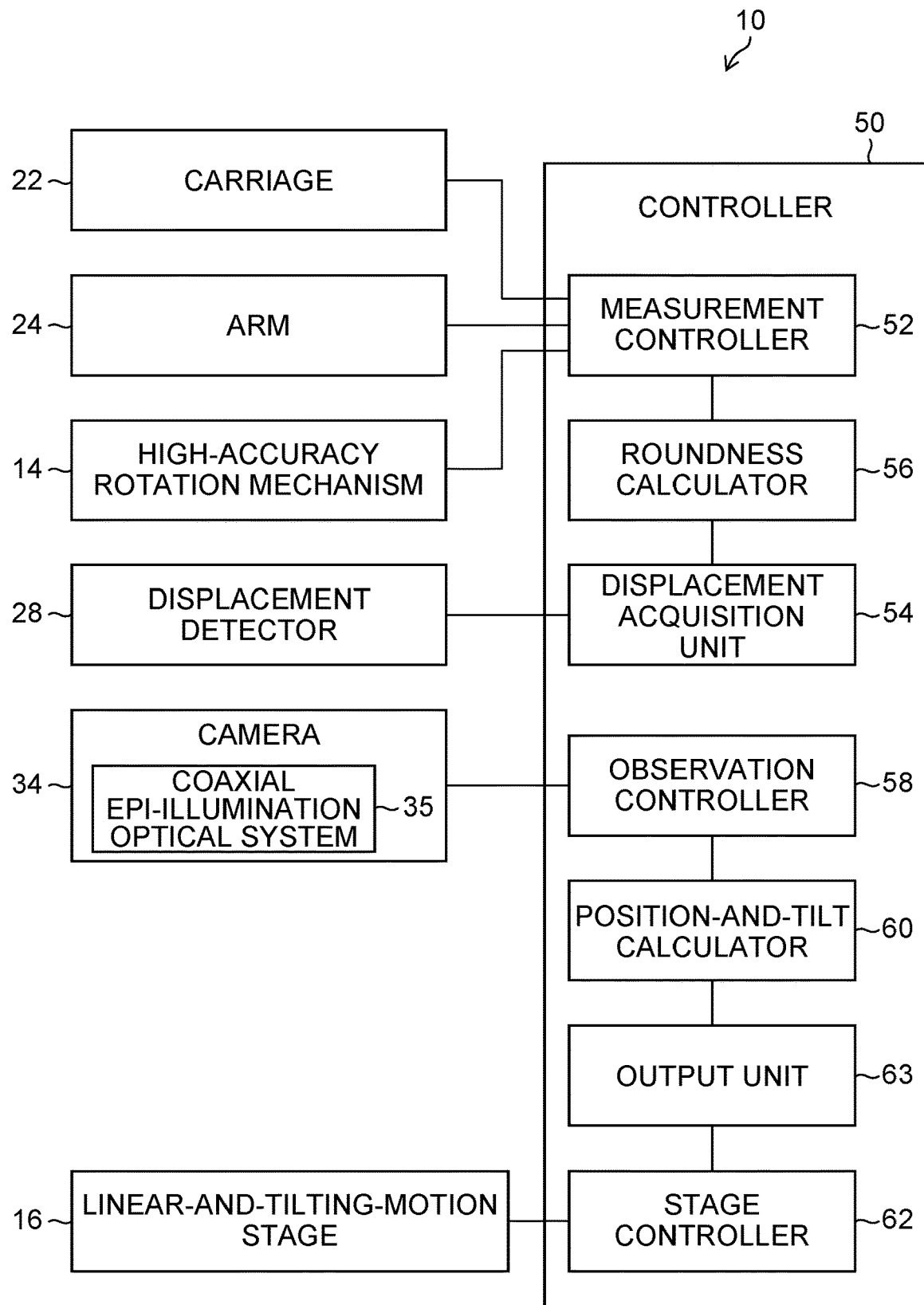
FIG. 3 is a block diagram illustrating an electrical configuration of the inner surface shape measurement device.

FIG. 3 is a block diagram illustrating an electrical configuration of the inner surface shape measurement device 10. The inner surface shape measurement device 10 includes a controller 50.

The controller 50 is implemented by a general-purpose computer such as a personal computer or a microcomputer. The controller 50 includes a CPU (Central Processing Unit), a ROM (Read Only Memory), a RAM (Random Access Memory), and an input/output interface. In the controller 50, various programs such as control programs stored in the ROM are expanded in the RAM, and the programs expanded in the RAM are executed by the CPU to realize the functions of each part in the inner surface shape measurement device 10. Then, various arithmetic processes and control processes are executed via the input/output interface.

As illustrated in FIG. 3, the controller 50 includes a measurement controller 52, a displacement acquisition unit 54, a roundness calculator 56, an observation controller 58, a position-and-tilt calculator 60, a stage controller 62, and an output unit 63.

The measurement controller 52 controls the respective motors (not illustrated) connected to the carriage 22, the arm 24, and the rotating body 14; and controls the relative position between the probe 30 of the displacement detector 28 and the small hole H of the workpiece W.

The displacement acquisition unit 54 controls the displacement detector 28, and acquires the displacement of the hole wall of the small hole H detected by the displacement detector 28.

The roundness calculator 56 calculates the roundness of the small hole H from the relative position between the probe 30 and the workpiece W acquired from the measurement controller 52 and the displacement detected by the displacement detector 28.

The observation controller (the first and the second observation controller) 58 controls the camera 34, and acquires an image taken by the camera 34. The position-and-tilt calculator 60 calculates the position and tilt of the small hole H of the workpiece W from the image acquired by the observation controller 58. The stage controller 62 controls the motor (not illustrated) that drives the linear-and-tilting-motion stage 16 based on the position and tilt of the small hole H calculated by the position-and-tilt calculator 60, and changes the position and tilt of the linear-and-tilting-motion stage 16. The output unit 63 outputs the small hole information including the position and tilt of the small hole H acquired from the position-and-tilt calculator 60 to an output interface (not illustrated).

<Alignment Method>

As described above, to measure the inner surface shape such as the roundness of the small hole H of the workpiece W, alignment is required for aligning the central axis $A_H$ of the small hole H with the rotation axis $A_R$ of the rotating body 14. The alignment includes centering that adjusts the position in the XY plane and tilting that adjusts the tilt with respect to the XY plane. The inner surface shape measurement device 10 can perform centering and tilting using the linear-and-tilting-motion stage 16.

Figure 4:
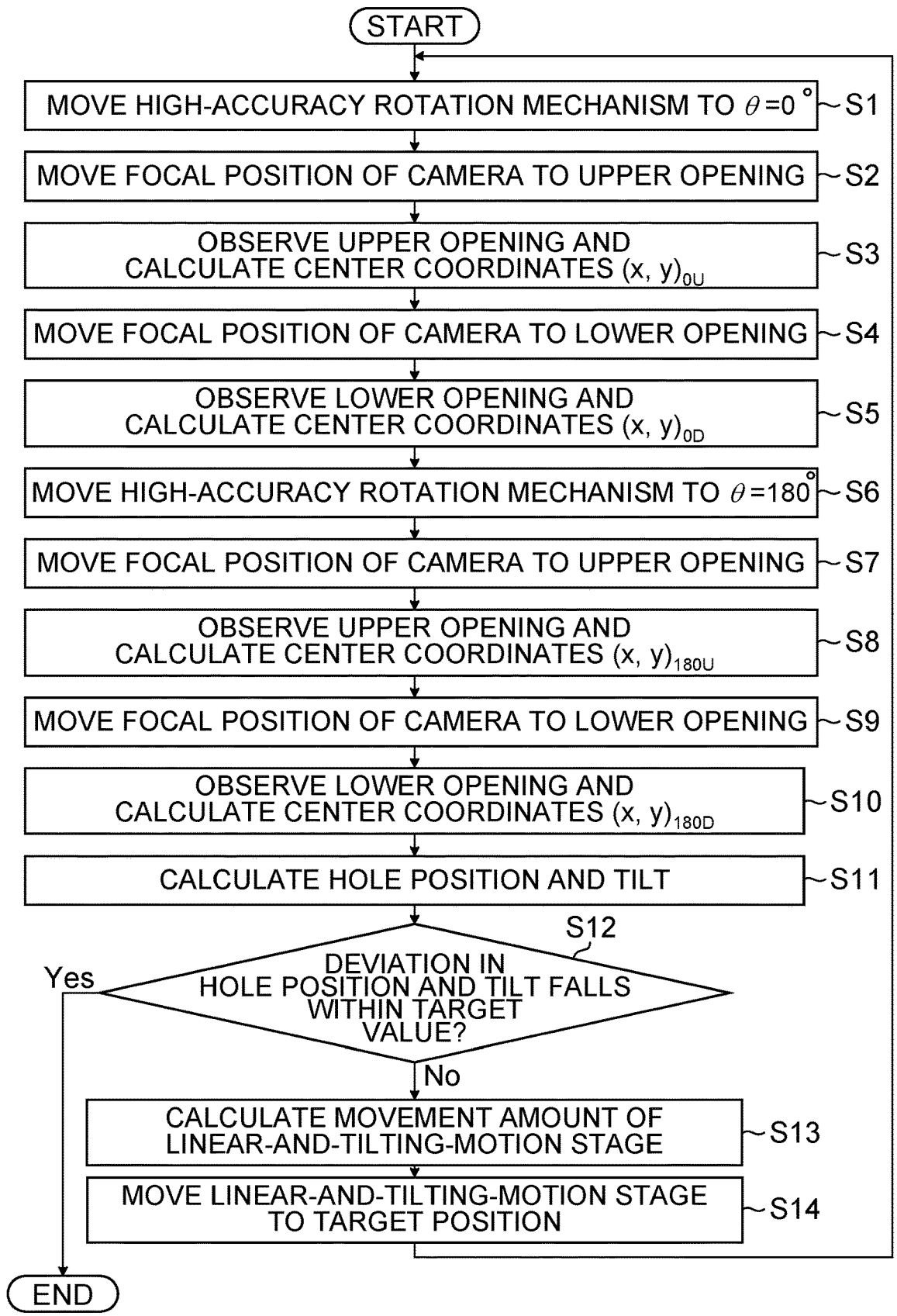
FIG. 4 is a flowchart illustrating an example of processing in an alignment method of an inner surface shape measurement device.

FIG. 4 is a flowchart illustrating an example of processing of the alignment method of the inner surface shape measurement device 10. Here, it is assumed that the workpiece W having a small hole H is installed on the workpiece installation jig 18 in advance. The workpiece installation jig 18 fixes the workpiece W with a gap provided at the lower opening $O_D$ (see FIG. 7) of the small hole H of the workpiece W (with the lower opening $O_D$ not blocked).

In step S1, the measurement controller 52 drives the motor (not illustrated) according to the result detected by the encoder (not illustrated) of the rotating body 14, and moves (rotates) the rotating body 14 to a position where the rotation angle is a set angle $\theta=0°$ (an example of a first rotation angle).

In step S2, the measurement controller 52 drives the motor (not illustrated) of the arm 24 to move the camera 34 upward in the Z direction of the workpiece W. Further, the measurement controller 52 drives the motor (not illustrated) of the carriage 22 to move the camera 34 in the Z direction, and aligns the focal position of the camera 34 with the upper opening $O_U$ (an example of a first position) of the small hole H.

In the following step S3 (an example of an observation control step), the observation controller 58 observes (images) the upper opening $O_U$ of the small hole H using the camera 34. Further, the position-and-tilt calculator 60 calculates the center coordinates $(x, y)_{O_U}$ of the upper opening $O_U$ of the small hole H at the set angle $\theta=0°$.

Figure 5:
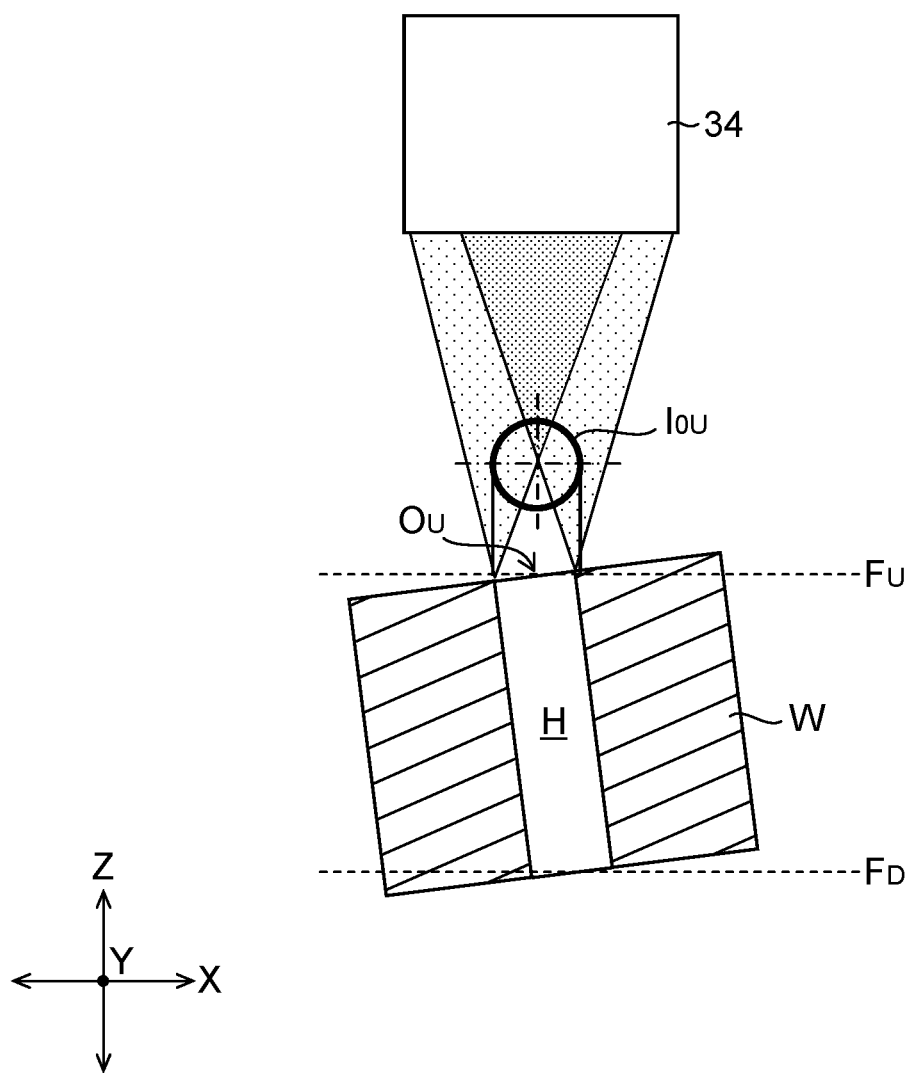
FIG. 5 is a schematic diagram illustrating observation of an upper opening of a small hole using a camera.

FIG. 5 is a schematic diagram illustrating the observation of the upper opening $O_U$ of the small hole H using the camera 34. In FIG. 5, the workpiece W is illustrated in cross section. The focal plane $F_U$ illustrated in FIG. 5 is a plane orthogonal to the optical axis $A_C$ of the camera 34 and includes the focal point of the camera 34, and is aligned with the position of the upper opening $O_U$ of the small hole H here. Further, the dot hatch part illustrated in FIG. 5 is an optical path of light, incident on the camera 34, for observing the upper opening $O_U$, and the image $I_{O_U}$ illustrated in FIG. 5 is an image (in the Z direction view) of the edge portion of the upper opening $O_U$ observed by the camera 34.

Figure 6:
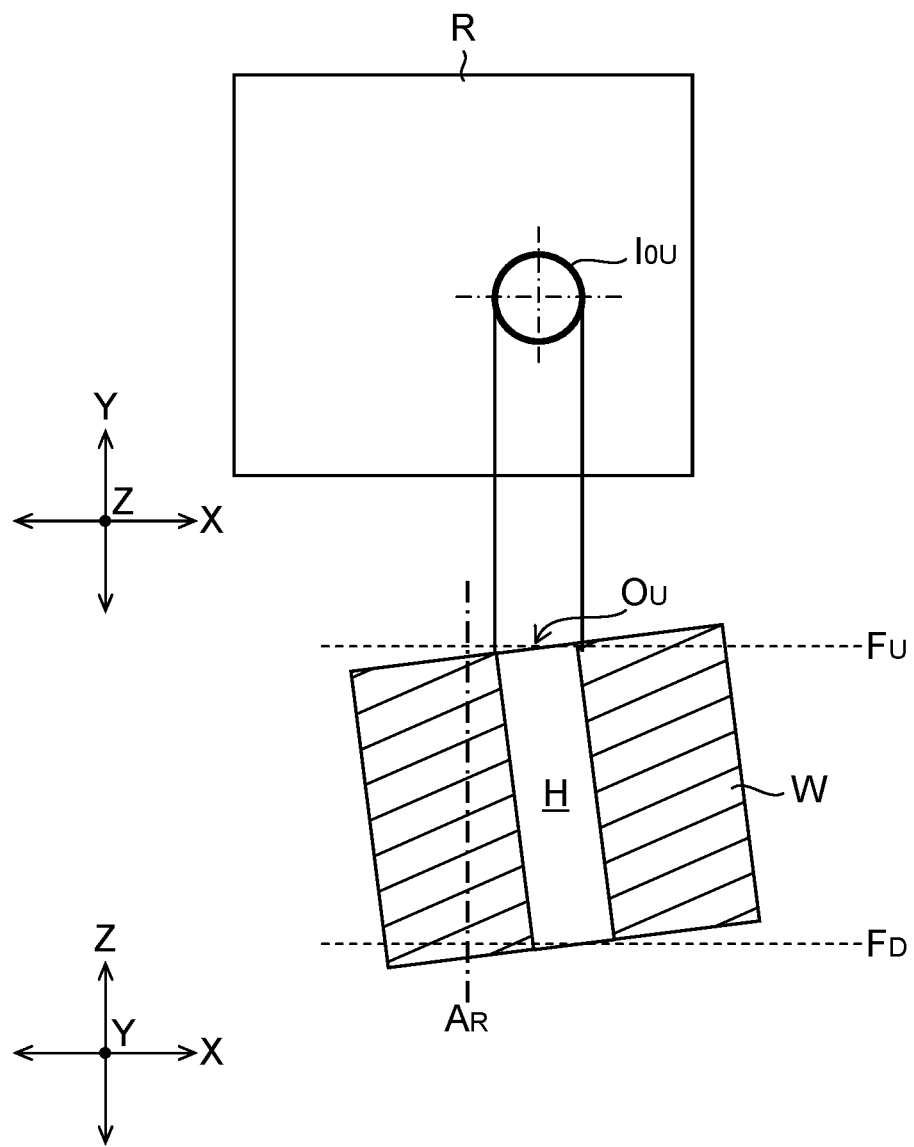
FIG. 6 is a diagram illustrating a positional relationship among a rotation axis of a rotating body, the upper opening at a set angle $\theta=0°$ of the rotating body, and an image of the upper opening in an imaging range of the camera.

FIG. 6 is a diagram illustrating the rotation axis $A_R$ of the rotating body 14, the upper opening $O_U$ of the small hole H of the workpiece W at the set angle $\theta=0°$ of the rotating body 14, the positional relationship between the imaging range R of the camera 34 and the image $I_{O_U}$ observed in step S3 in the imaging range R. In FIG. 6, the imaging range R is illustrated in the Z direction view, and the workpiece W is illustrated in cross section in the Y direction view.

The position-and-tilt calculator 60 calculates the center coordinates $(x, y)_{OU}$ of the upper opening $O_U$ of the small hole H at the set angle θ=0°, from the image $I_{OU}$.

Next, in step S4, the measurement controller 52 drives the motor (not illustrated) of the carriage 22 to move the camera 34 in the Z direction, and adjusts the focal position of the camera 34 to the lower opening $O_D$ (an example of a second position) whose position in the Z direction is different from that of the upper opening $O_{DU}$ of the small hole H.

In the following step S5 (an example of the observation control step), the observation controller 58 observes the lower opening $O_D$ of the small hole H using the camera 34. Further, the position-and-tilt calculator 60 calculates the center coordinates $(x, y)_{OD}$ of the lower opening $O_D$ of the small hole H at the set angle θ=0°.

FIG. 7 is a schematic diagram illustrating the observation of the lower opening $O_D$ of the small hole H using the camera 34. In FIG. 7, the workpiece W is illustrated in cross section. As illustrated in FIG. 7, the focal plane $F_D$ is aligned with the position of the lower opening $O_D$ of the small hole H. Further, the dot hatch part illustrated in FIG. 7 is an optical path of light, incident on the camera 34, for observing the lower opening $O_D$, and the image $I_{OU}$ illustrated in FIG. 7 is an image (in the Z direction view) of the edge portion of the lower opening $O_D$ observed by the camera 34.

Figure 8:
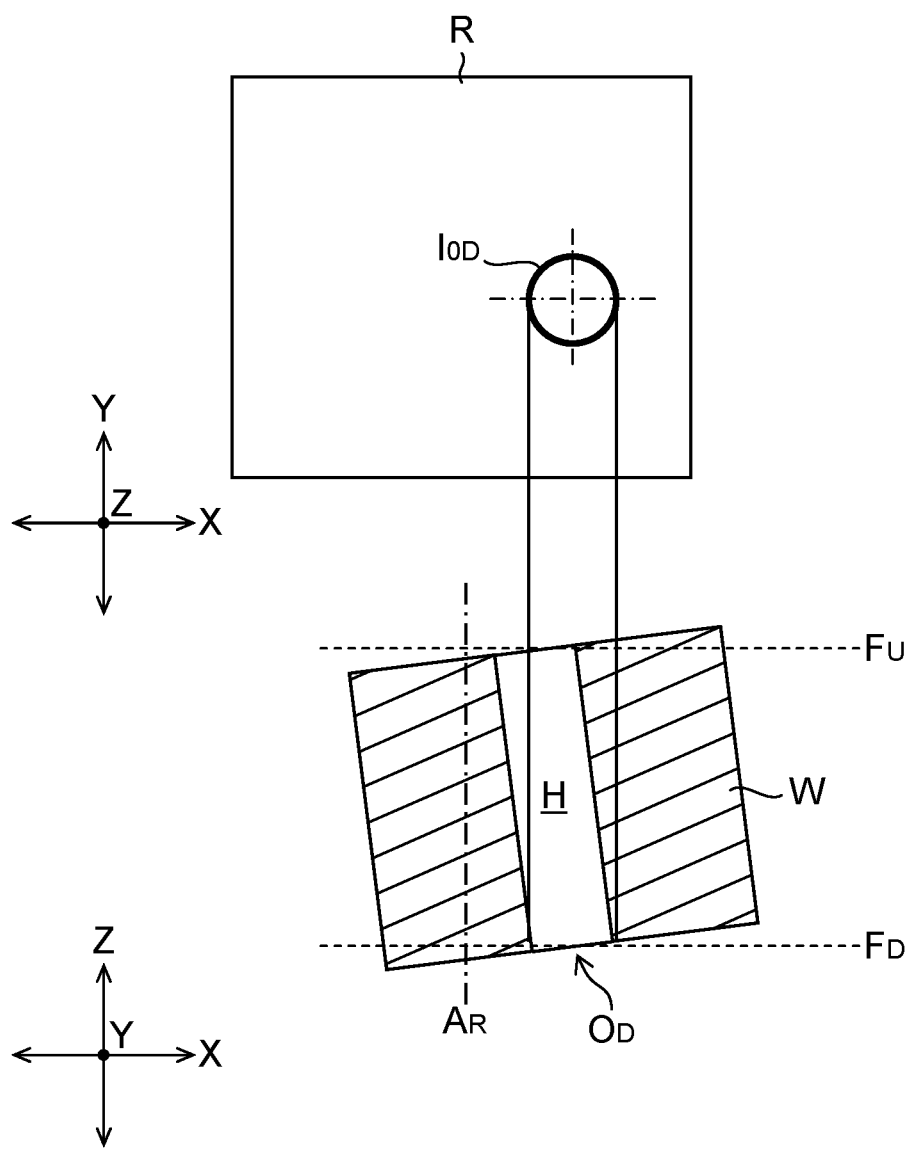
FIG. 8 is a diagram illustrating a positional relationship among the rotation axis of the rotating body, the lower opening at the set angle $\theta=0°$ of the rotating body, and an image of the lower opening in an imaging range of the camera.

FIG. 8 is a diagram illustrating the positional relationship among the rotation axis $A_R$ of the rotating body 14, the lower opening $O_D$ of the small hole H of the workpiece W at the set angle θ=0° of the rotating body 14, and the image $I_{OD}$ observed in step S5 in the imaging range R of a camera 34. In FIG. 8, the imaging range R is illustrated in the Z direction view, and the workpiece W is illustrated in cross section in the Y direction view.

The position-and-tilt calculator 60 calculates the center coordinates $(x, y)_{OD}$ of the lower opening $O_D$ of the small hole H at the set angle θ=0°, from the image $I_{OD}$.

Next, in step S6, the measurement controller 52 drives the motor (not illustrated) according to the result detected by the encoder (not illustrated) of the rotating body 14, and moves the rotating body 14 to a position where the rotation angle is a set angle θ=180° (an example of a second rotation angle).

In step S7, the measurement controller 52 drives the motor (not illustrated) of the carriage 22 to move the camera 34 in the Z direction, and aligns the focal position of the camera 34 with the upper opening $O_U$.

In the following step S8 (an example of the observation control step), the observation controller 58 observes the upper opening $O_U$ of the small hole H using the camera 34. Further, the position-and-tilt calculator 60 calculates the center coordinates $(x, y)_{180U}$ of the upper opening $O_U$ of the small hole H at the set angle θ=180°, from the image $I_{180U}$.

Figure 9:
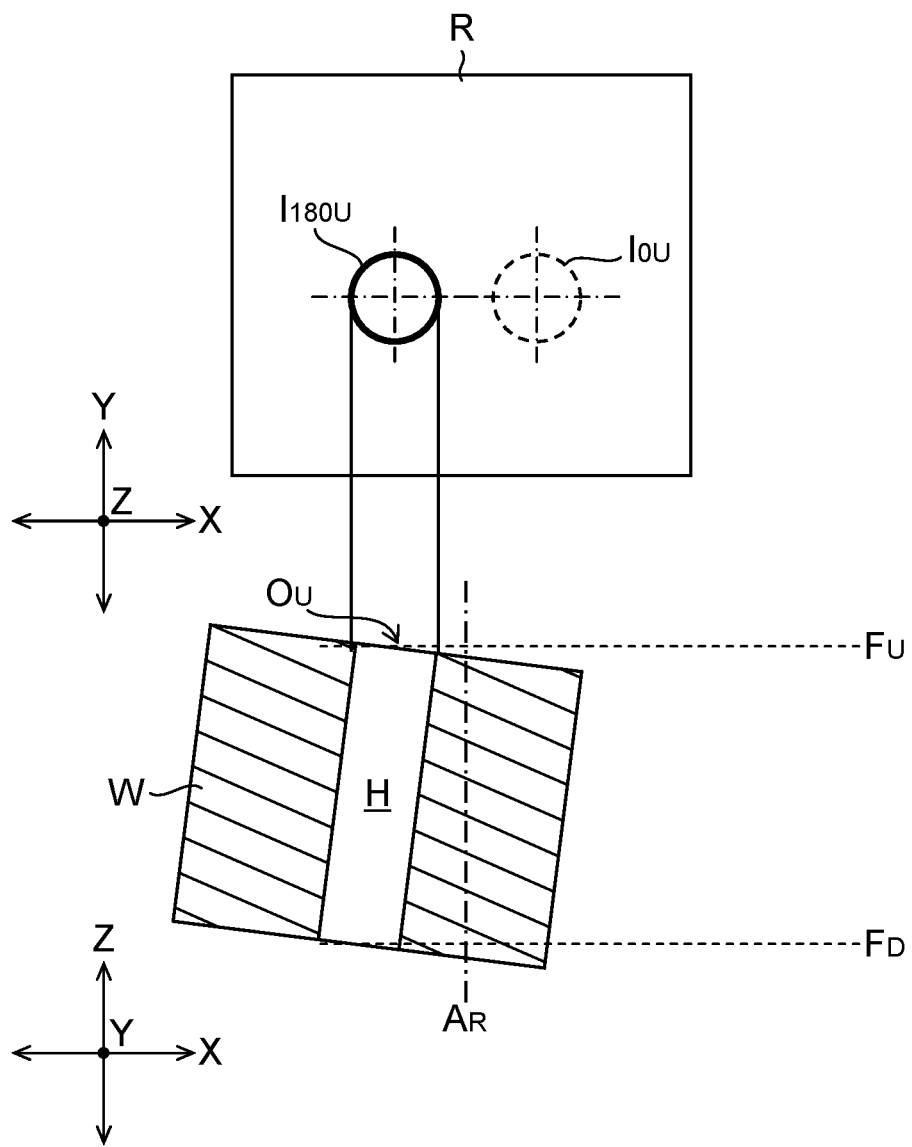
FIG. 9 is a diagram illustrating a positional relationship among the rotation axis of the rotating body, the upper opening at a set angle $\theta=180°$ of the rotating body, and an image of the upper opening in an imaging range of the camera.

FIG. 9 is a diagram illustrating the positional relationship among the rotation axis $A_R$ of the rotating body 14, the upper opening $O_U$ of the small hole H of the workpiece W at the set angle θ=180° of the rotating body 14, and the image $I_{OU}$ observed in step S8 in the imaging range R of the camera 34. In FIG. 9, the imaging range R is illustrated in the Z direction view, and the workpiece W is illustrated in cross section in the Y direction view.

The position-and-tilt calculator 60 calculates the center coordinates $(x, y)_{180U}$ of the upper opening $O_U$ of the small hole H at the set angle θ=180°, from the image $I_{180U}$.

Next, in step S9, the measurement controller 52 drives the motor (not illustrated) of the carriage 22 to move the camera 34 in the Z direction, and aligns the focal position of the camera 34 with the lower opening $O_D$ of the small hole H.

In the following step S10 (an example of the observation control step), the observation controller 58 observes the lower opening $O_D$ of the small hole H using the camera 34. Further, the position-and-tilt calculator 60 calculates the center coordinates $(x, y)_{180U}$ of the lower opening $O_D$ of the small hole H at the set angle θ=180°, from the image $I_{180D}$.

Figure 10:
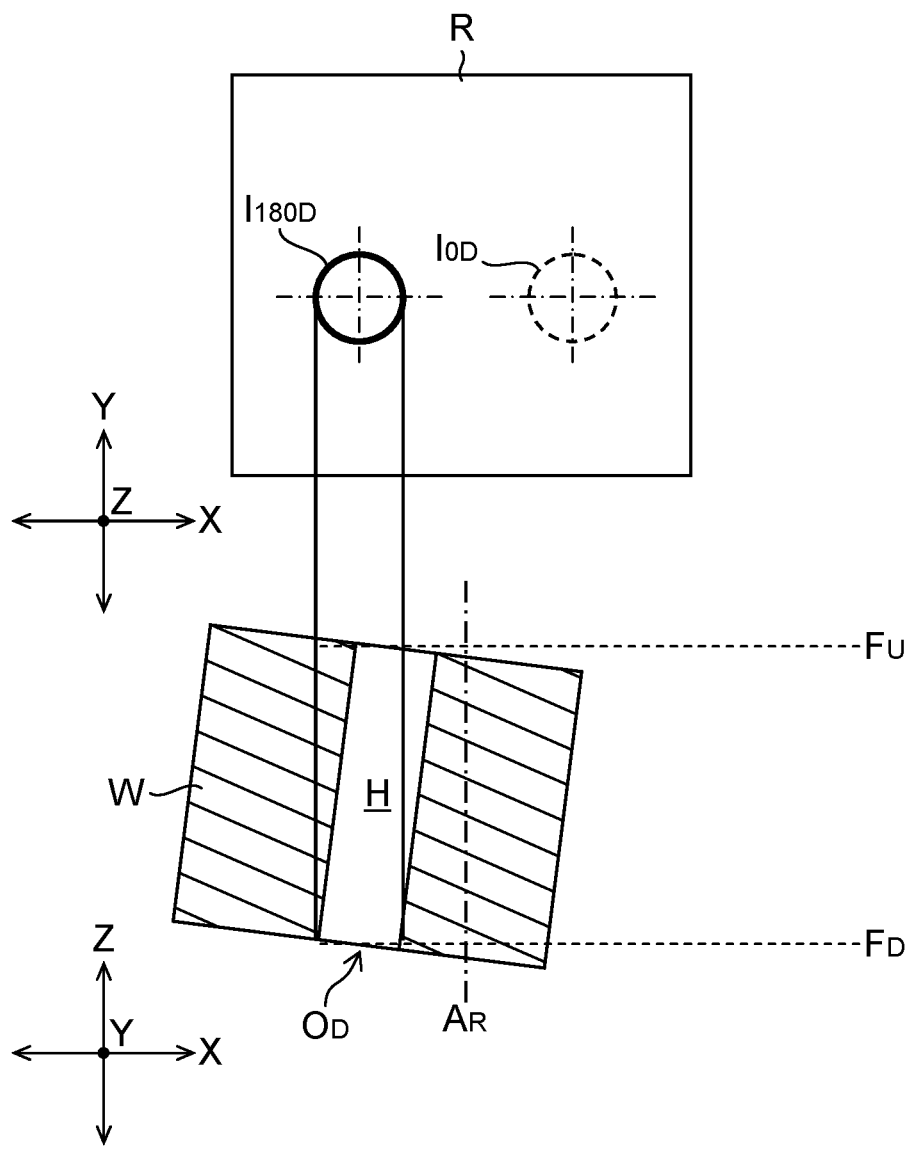
FIG. 10 is a diagram illustrating a positional relationship among the rotation axis of the rotating body, the lower opening at the set angle $\theta=180°$ of the rotating body, and an image of the lower opening in an imaging range of the camera.

FIG. 10 is a diagram illustrating the positional relationship among the rotation axis $A_R$ of the rotating body 14, the lower opening $O_D$ of the small hole H of the workpiece W at the set angle θ=180° of the rotating body 14, and the image $I_{OD}$ observed in step S10 in the imaging range R of the camera 34. In FIG. 10, the imaging range R is illustrated in the Z direction view, and the workpiece W is illustrated in cross section in the Y direction view.

The position-and-tilt calculator 60 calculates the center coordinates $(x, y)_{180U}$ of the lower opening $O_D$ of the small hole H at the set angle θ=180°, from the image $I_{180D}$.

In step S11 (an example of a position-and-tilt calculation step), the position-and-tilt calculator 60 calculates the position and tilt of the central axis $A_H$ of the small hole H of the workpiece W with respect to the rotation axis $A_R$ of the rotating body 14, from the center coordinates $(x, y)_{OU}$ of the upper opening $O_U$ and the center coordinates $(x, y)_{OU}$ of the lower opening $O_D$ of the small hole H at the set angle θ=0°, and the center coordinates $(x, y)_{180U}$ of the upper opening $O_U$ and the center coordinates $(x, y)_{180U}$ of the lower opening $O_D$ of the small hole H at the set angle θ=180°.

In step S12, the position-and-tilt calculator 60 determines whether the deviation between the position and tilt of the central axis $A_H$ of the small hole H of the workpiece W, and the rotation axis $A_R$ are within the target value. If the deviation is larger than the target value, the controller 50 performs processing of step S13. If the deviation is within the target value, the processing of this flowchart ends.

Figure 11:
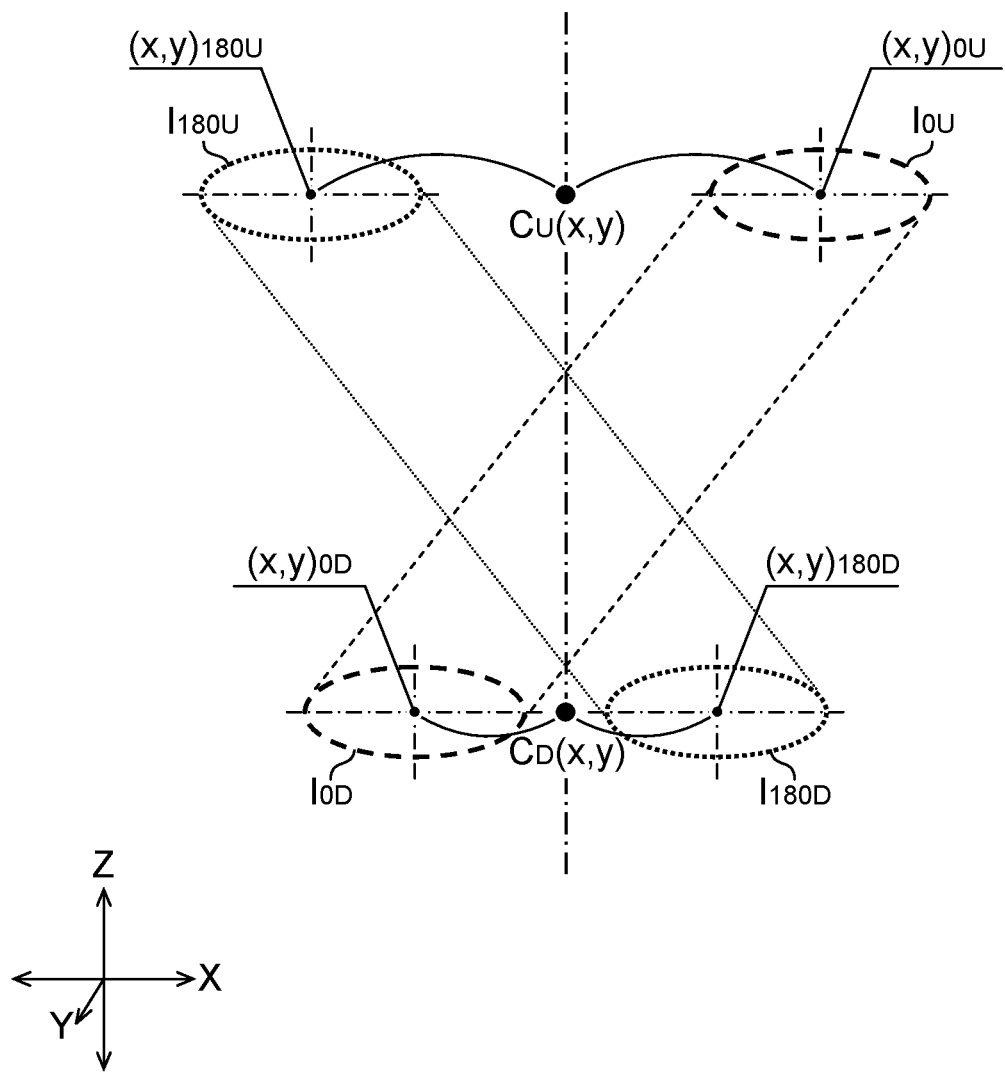
FIG. 11 is a diagram for explaining movement target coordinates of the upper opening and movement target coordinates of the lower opening.

In step S13, the position-and-tilt calculator 60 calculates a movement amount of the linear-and-tilting-motion stage 16. FIG. 11 is a diagram for explaining the movement target coordinates $C_U(x, y)$ of the upper opening $O_U$ and the movement target coordinates $C_D(x, y)$ of the lower opening $O_D$. FIG. 11 illustrates the positional relationship of: the center coordinates $(x, y)_{OU}$ of the upper opening $O_U$ and the center coordinates $(x, y)_{OD}$ of the lower opening $O_D$ of the small hole H at the set angle θ=0°; the center coordinates $(x, y)_{180U}$ of the upper opening $O_U$ and the center coordinates $(x, y)_{180D}$ of the lower opening $O_D$ of the small hole H at the set angle θ=180°; the movement target coordinates $C_U(x, y)$ of the upper opening $O_U$; and the movement target coordinates $C_D(x, y)$ of the lower opening $O_D$.

As illustrated in FIG. 11, the movement target coordinates $C_U(x, y)$ of the upper opening $O_U$ are expressed as:

$$C_U(x,y)=\{(x,y)_{OU}+(x,y)_{180U}\}/2 \quad \text{(Expression 1)}$$

Similarly, the movement target coordinates $C_D(x, y)$ of the lower opening $O_D$ are expressed as:

$$C_D(x,y)=\{(x,y)_{OD}+(x,y)_{180D}\}/2 \quad \text{(Expression 2)}$$

The position-and-tilt calculator 60 calculates the movement amount of the linear-and-tilting-motion stage 16 from the movement target coordinates $C_U(x, y)$ of the upper opening $O_U$ and the movement target coordinates $C_D(x, y)$ of the lower opening $O_D$. The output unit 63 acquires the movement amount (an example of the small hole information) of the linear-and-tilting-motion stage 16 calculated by the position-and-tilt calculator 60, and outputs it to the stage controller 62 (an example of an output step).

In step S14 (an example of a stage control step), the stage controller 62 drives the motor (not illustrated) of the linear-and-tilting-motion stage 16 based on the movement amount calculated in step S13, to move the linear-and-tilting-motion stage 16 to the target position. After that, the process proceeds to step S1, and the controller 50 performs the same processing. The inner surface shape measurement device 10 repeats this processing, and thereby makes the deviation between the central axis $A_H$ of the small hole H of the workpiece W and the rotation axis $A_R$ of the rotating body 14 within the target value.

As described above, the alignment method according to the present embodiment makes it possible to align the central axis $A_H$ of the small hole H with the rotation axis $A_R$ of the rotating body 14. The present embodiment does not require the optical axis $A_C$ of the camera 34 to be aligned with the rotation axis $A_R$ of the rotating body 14, and therefore makes it possible to perform alignment with a simple configuration. The alignment method according to the present embodiment is effective when the small hole H is an extremely small diameter hole having an inner diameter of 500 μm or less. Further, the alignment method is particularly effective when the diameter of the small hole H is 200 μm or less and the diameter of the probe 30 is 100 μm or less. Further, the small hole H may have a diameter larger than 500 μm.

Here, the setting angle θ of the rotation angle of the rotating body 14 in observing the upper opening $O_U$ and the lower opening $O_D$ using the camera 34 is set to θ=0° and θ=180°, which are 180° different angles from each other. This makes it possible to accurately calculates the deviation between the central axis $A_H$ of the small hole H of the workpiece W and the rotation axis $A_R$.

Further, to measure the cylindricity of the workpiece W with high accuracy, the inner surface shape measurement device 10 has the column 20 erected in parallel with the rotation axis $A_R$ of the rotating body 14. In the present embodiment, when the observation is switched between the upper opening $O_U$ and the lower opening $O_D$ of the small hole H, the focal position of the camera 34 was moved by using the vertical linear-motion mechanism of the carriage 22. This makes the focus control mechanism of the camera 34 unnecessary, and enables highly accurate alignment. For example, the position of the rotation axis in the focal plane does not move, making it possible to use a high-magnification optical system.

Further, the output unit 63 may output the movement amount (an example of the small hole information) of the linear-and-tilting-motion stage 16, which is acquired from the position-and-tilt calculator 60, to an output interface (not illustrated) or the like (an example of the output step). Further, the output unit 63 may acquire the small hole information including the position and tilt of the central axis $A_H$ of the small hole H of the workpiece W with respect to the rotation axis $A_R$ of the rotating body 14 calculated in step S11, and may output the small hole information to an output interface (not illustrated) or the like (an example of the output step). The user can manually operate the linear-and-tilting-motion stage 16 based on the output information, and thereby align the central axis $A_H$ of the small hole H of the workpiece W with the rotation axis $A_R$ of the rotating body 14. In the present embodiment, the output unit 63 outputs the acquired movement amount to the stage controller 62.

<Workpiece Installation Jig>

Observing the lower opening $O_D$ of the small hole H requires the angle (tilt) of the small hole H to be kept within a certain range when the workpiece W is installed on the workpiece installation jig 18.

Figure 12:
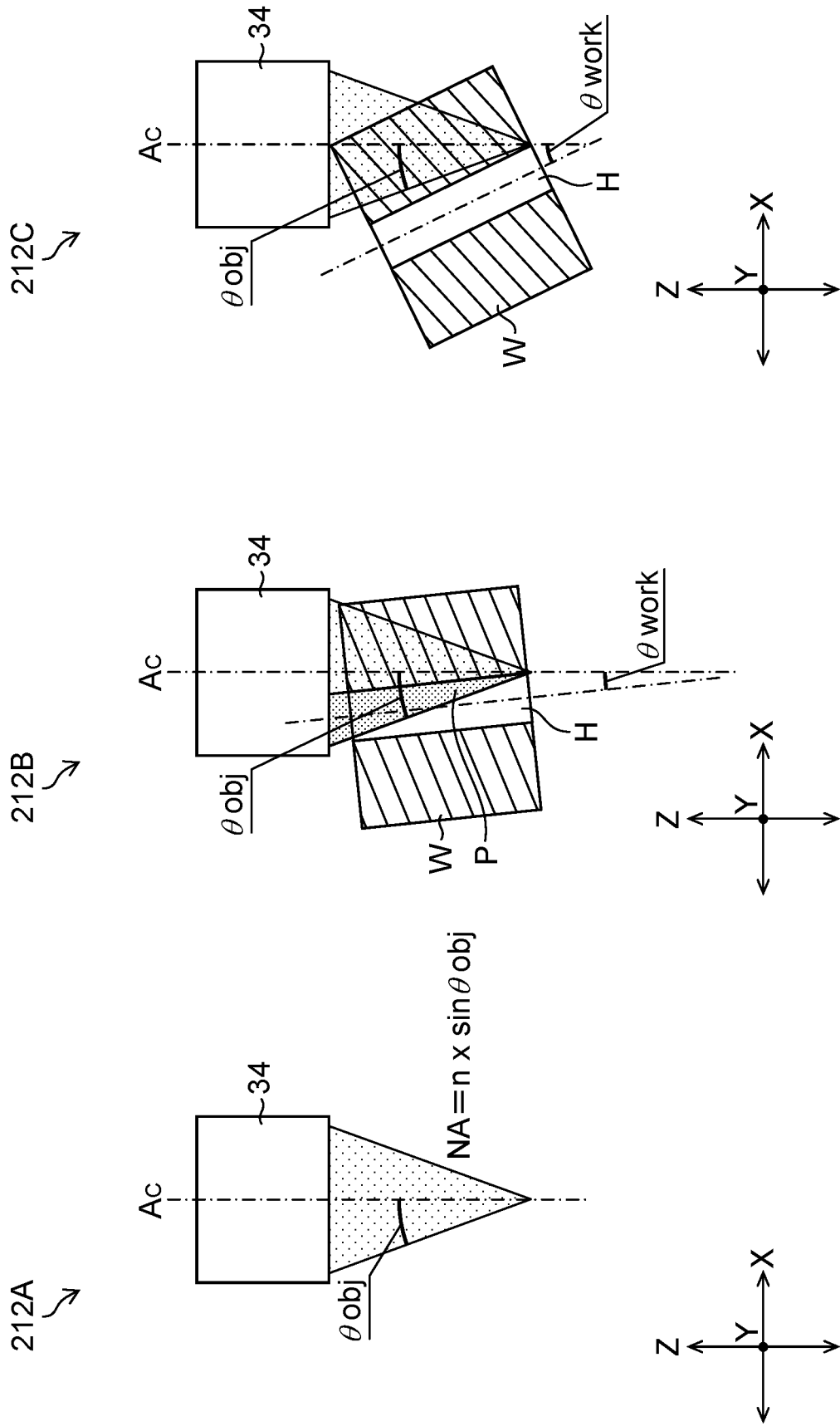
FIG. 12 is a diagram illustrating a relationship between the camera and the small hole in a workpiece using a workpiece installation jig.

FIG. 12 is a diagram illustrating relationships between the camera and the small hole of the workpiece set by the workpiece installation jig. In FIG. 12, 212A illustrates the maximum angle of the observation light incident on the objective lens (not illustrated) of the camera 34 with respect to the optical axis $A_C$. As illustrated in 212A, the number of openings of the objective lens of the camera 34 NA is calculated by the following expression:

$$NA = n \times \sin \theta_{obj} \quad \text{(Expression 3)}$$

where: $\theta_{obj}$ is the maximum angle of the observation light incident on the objective lens with respect to the optical axis $A_C$ of the camera 34, and n is the refractive index of the optical path of the observation light. Therefore, assuming that the refractive index n of the air in the optical path of the observation light is 1.0, there is required a workpiece installation jig 18 capable of positioning the workpiece W to satisfy:

$$\theta_{work} < a\sin(NA) \quad \text{(Expression 4)}$$

where: $\theta_{work}$ is the tilt angle of the small hole H with respect to the rotation axis $A_R$ of the rotating body 14.

In FIG. 12, 212B illustrates a relationship between the camera 34 and the workpiece W when there is a relationship of $\theta_{work} < \theta_{obj}$. In 212B, the workpiece W is illustrated in cross section. The optical path P illustrated in 212B is an optical path that can be used for observing the lower opening $O_D$ among the optical paths of the observation light incident on the camera 34. In this way, in the case illustrated in 212B, it is possible to observe the lower opening $O_D$ using the camera 34.

In FIG. 12, 212C illustrates a relationship between the camera 34 and the workpiece W when there is a relationship of $\theta_{work} > \theta_{obj}$. In 212C, the workpiece W is illustrated in cross section. In the case illustrated in 212C, the observation light of the lower opening $O_D$ does not reach the camera 34, and it is not possible to observe the lower opening $O_D$ using the camera 34.

<Position for Observing Small Hole>

The above example, illustrates an example of observing the upper opening $O_{DU}$ and the lower opening $O_D$ of the small hole H. However, the position for observing the small hole H is not limited to the opening, and it may be an intermediate position of the small hole H.

Figure 13:
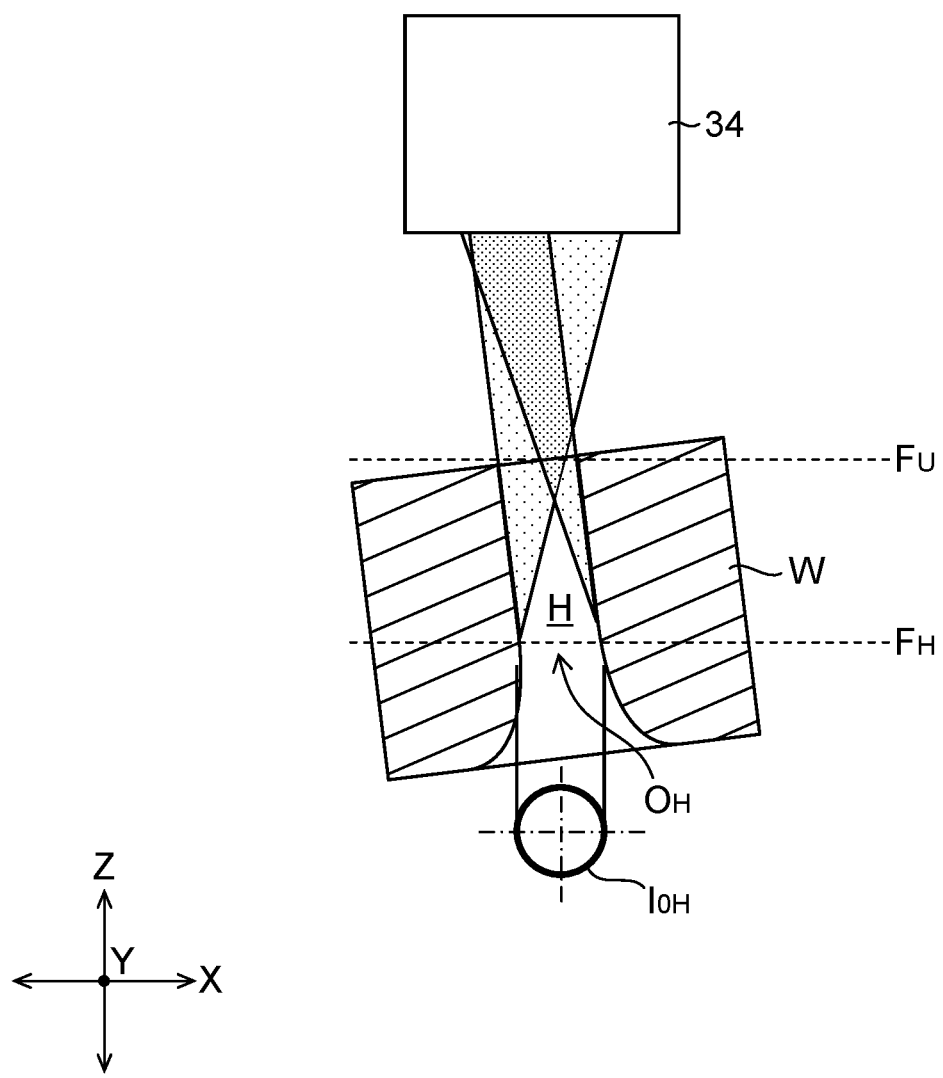
FIG. 13 is a schematic diagram illustrating observation of an intermediate position of the small hole using the camera.

FIG. 13 is a schematic diagram illustrating observation using a camera 34 at an intermediate position $O_H$ (an example of a second position) whose position in the Z direction is different from that of the upper opening $O_{DU}$ and the lower opening $O_D$ of the small hole H. In FIG. 13, the workpiece W is illustrated in cross section. The small hole H illustrated in FIG. 13 has an R at the edge portion of the lower opening $O_D$ (the lower opening $O_D$ has an R shape). As a result, in the example illustrated in FIG. 13, the focal plane FH is aligned with the intermediate position $O_H$ of the small hole H. Further, the dot hatch part illustrated in FIG. 13 is an optical path of light, incident on the camera 34, for observing the intermediate position $O_H$. The image $I_{OH}$ illustrated in FIG. 13 is the image (in the Z direction view) of the intermediate position $O_H$ observed by the camera 34.

In this way, when the upper opening $O_{DU}$ and the lower opening $O_D$ of the small hole H have chamfers or $R_S$ and it is difficult to observe the edge shape of the small hole H, it is effective to observe the intermediate position of the small hole H. In using the intermediate position of the small hole H, detecting the position of the small hole H can use techniques of selecting high-contrast (focused) regions in an image, measurement using the white interference method, or the like.

<Case in which Position of Small Hole Largely Deviates from Rotation Axis>

In the above example, when the rotating body 14 is rotated, the small hole H is always within the imaging range of the camera 34 fixed in the X direction. In other words, the small hole H is arranged from the beginning at a position close to the rotation axis $A_R$ of the rotating body 14 so as to be within the imaging range of the camera 34. However, also when the small hole H is arranged so as to largely deviate from the rotation axis $A_R$ of the rotating body 14, operating the horizontal linear-motion mechanism allows the same technique to be applied.

FIG. 14 is a schematic diagram illustrating the observation of the small hole H using a camera 34 in time series when the small hole H of the workpiece W is arranged so as to largely deviate from the rotation axis $A_R$ of the rotating body 14.

In FIG. 14, 214A illustrates a state in which the small hole H of the workpiece W is not within the imaging range of the camera 34. Here, the measurement controller 52 moves the rotating body 14 to a position where the rotation angle is a set angle $\theta=\theta_A$. The set angle $\theta=\theta_A$ is an angle at which the small hole H of the workpiece W and the arm 24 overlap in the Z direction view. The movement to the position of the set angle $\theta=\theta_A$ may be performed in a way of: positioning the rotating body 14 using a jig; or moving the rotating body 14 at each position of the camera 34, positioned by moving the arm 24, to search the small hole H using the camera 34.

In FIG. 14, 214B illustrates how the observation controller 58 moves the arm 24, which is a horizontal linear-motion mechanism, to the position $P_A$ where the small hole H enters the field of view of the camera 34. At this position $P_A$, the observation controller 58 observes the upper opening $O_U$ and the lower opening $O_D$ of the small hole H using the camera 34. Then, the position-and-tilt calculator 60 calculates the center coordinates $(x, y)_{AU}$ of the upper opening $O_U$ and the center coordinates $(x, y)_{AD}$ of the lower opening $O_D$ of the small hole H at the set angle $\theta=\theta_A$. Further, the position-and-tilt calculator 60 stores the position $P_A$ of the arm 24.

In FIG. 14, 214C illustrates how the measurement controller 52 moves the rotating body 14 to a position where the rotation angle is a set angle $\theta=\theta_A+180°=\theta_B$.

In FIG. 14, 214D illustrates how the observation controller 58 moves the arm 24, which is a horizontal linear-motion mechanism, to a position $P_B$ where the small hole H enters the field of view of the camera 34. At this position $P_B$, the observation controller 58 observes the upper opening $O_U$ and the lower opening $O_D$ of the small hole H using the camera 34. Then, the position-and-tilt calculator 60 calculates the center coordinates $(x, y)_{BU}$ of the upper opening $O_U$ and the center coordinates (x, y) BD of the lower opening $O_D$ of the small hole H at the set angle $\theta=\theta_B$. Further, the position-and-tilt calculator 60 stores the position $P_B$ of the arm 24.

The position-and-tilt calculator 60 can calculate the position and tilt of the small hole H of the workpiece W with respect to the rotation axis $A_R$ of the rotating body 14 from thus acquired: the center coordinates $(x, y)_{AU}$ of the upper opening $O_U$ and the center coordinates $(x, y)_{AD}$ of the lower opening $O_D$ of the small hole H at the set angle $\theta=\theta_A$, and the position of the arm 24 $P_A$; and the center coordinates (x, $y)_{BU}$ of the upper opening $O_U$ and the center coordinates (x, $y)_{BD}$ of the lower opening $O_D$ of the small hole H at the set angle $\theta=\theta_B$, and the position of the arm 24 $P_B$.

<Other Examples of Calculating Position and Tilt of Small Hole>

The above example illustrates an example of observation with two rotation angles, but the rotation angle of the rotating body 14 may be set to three or more angles, or set continuously. For example, the position and tilt of the small hole H may be calculated from the locus of the center coordinates.

Figure 15:
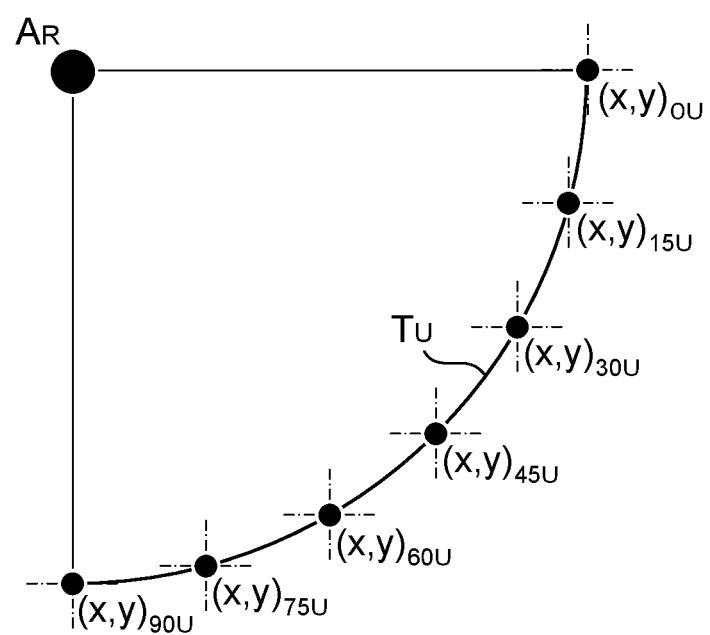
FIG. 15 is a diagram illustrating a locus of center coordinates of the upper opening of the small hole in a imaging range of the camera when the rotating body is rotated.

FIG. 15 is a diagram illustrating a locus $T_U$ of the center coordinates of the upper opening $O_U$ of the small hole H in the imaging range R of the camera 34 when the rotating body 14 is rotated. Here illustrates the locus when the rotation angle of the rotating body 14 is rotated from the set angle $\theta=0°$ to the set angle $\theta=90°$. From this locus $T_U$, the position-and-tilt calculator 60 calculates $(x, y)_{0U}$, $(x, y)_{15U}$, $(x, y)_{30U}$, $(x, y)_{45U}$, $(x, y)_{60U}$, $(x, y)_{75U}$, and $(x, y)_{90U}$, which are respectively center coordinates of set angles $0=0°$, 15°, 30°, 45°, 60°, 75°, and 90°, and calculates the movement target coordinates, that is, the coordinates of the rotation axis $A_R$, from these calculated center coordinates.

In this way, the calculation can be performed without rotating the rotating body 14 by 180°, so that the alignment can be speeded up. In addition, there is much information that can be used in determining the rotation center, making it possible to calculate the movement target coordinates with high accuracy.

<Light Quantity Adjustment>

Figure 16:
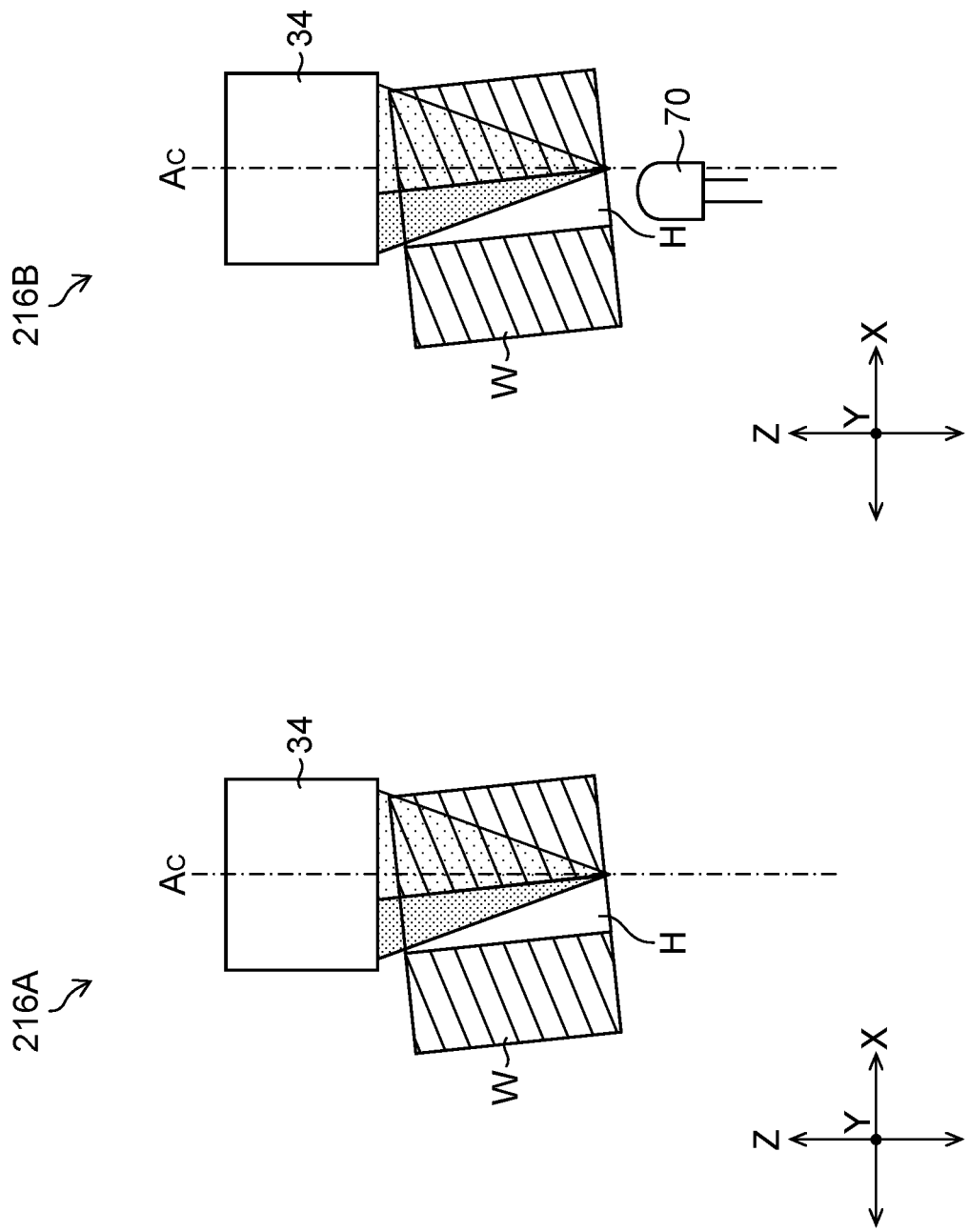
FIG. 16 is a diagram illustrating an optical path of light, incident on the camera, for observing the lower opening of the small hole in the workpiece.

FIG. 16 is a diagram illustrating an optical path of the light, incident on the camera, for observing the lower opening of the small hole of the workpiece. In 216A of FIG. 16, illustrates an optical path of the light, incident on the camera 34, for observing the lower opening $O_D$ of the small hole H of the workpiece W. In 216A, the workpiece W is illustrated in cross section. As illustrated in 216A, the optical path that can be used for observing the lower opening $O_D$ suffers from a small light quantity. In other words, the observation of the lower opening $O_D$ may be difficult due to insufficient light quantity as compared with the observation of the upper opening $O_U$. Therefore, there may be a mechanism to increase the light quantity in observing the lower opening $O_D$ with respect to that in observing the upper opening $O_U$.

In 216B of FIG. 16, there is illustrated a state in which a light source 70 for irradiating a small hole H is arranged on the lower opening $O_D$ side. In 216B, the workpiece W is illustrated in cross section. The light source 70 irradiates the small hole H from the lower opening $O_D$ (an example of the opening on the linear-and-tilting-motion stage side). The light source 70 preferably has a low coherence to reduce speckle noise. The light source 70 to be used may be, for example, a light source of an LED (Light Emitting Diode) or an ASE (Amplified Spontaneous Emission). It is more preferable that the center of the light source 70 is aligned with the rotation axis $A_R$ of the rotating body 14.

Thus arranging the light source on the lower opening $O_D$ side makes it possible to emphasize the shape edge of the lower opening $O_D$. This facilitates observing the lower opening $O_D$, and allows alignment with higher accuracy.

<Insertion of Reflector>

Figure 17:
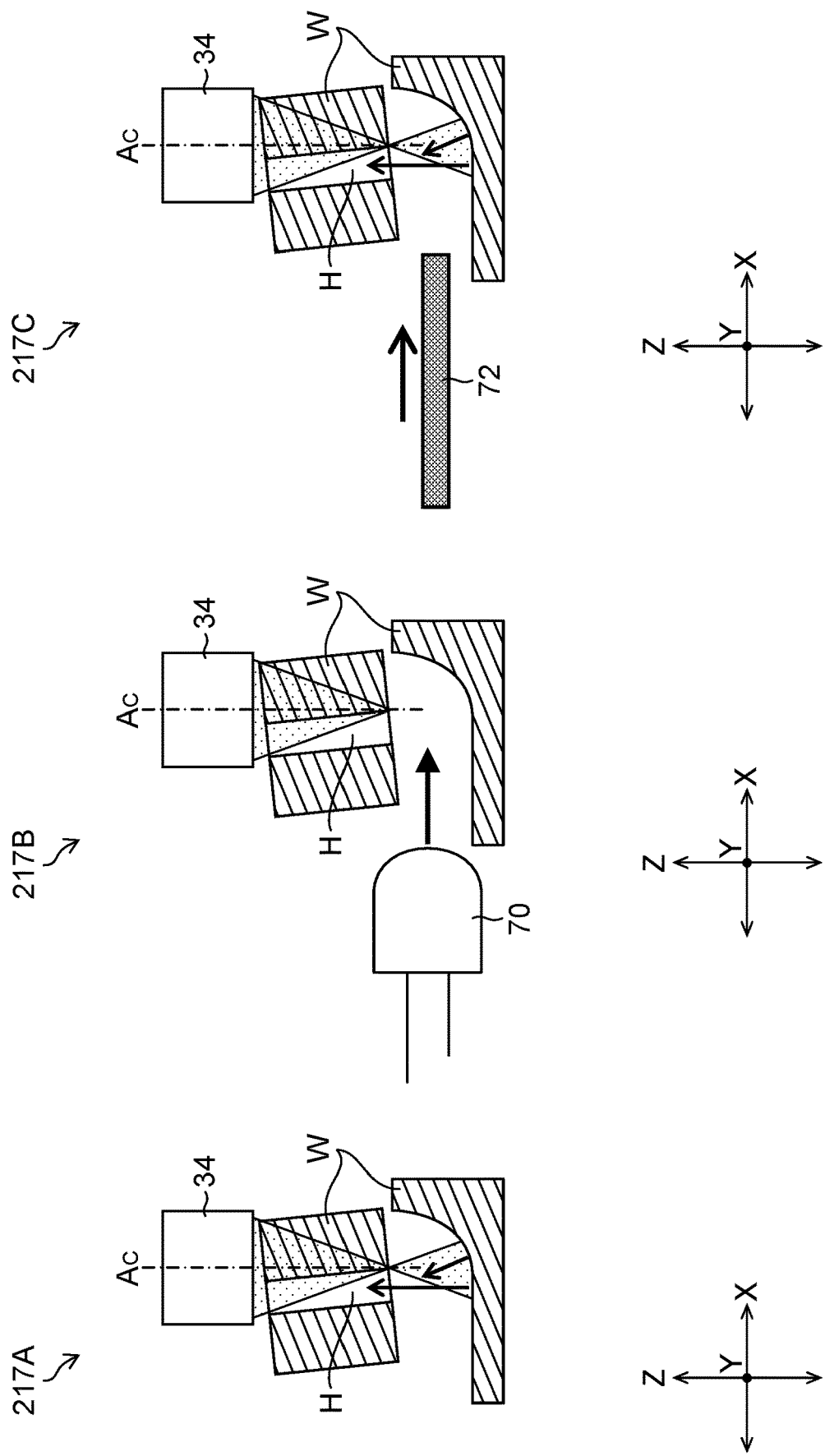
FIG. 17 is a diagram illustrating states of observing the lower opening of the small hole of the workpiece using the camera.

Depending on the shape of the workpiece W, it may be difficult to observe the lower opening $O_D$. FIG. 17 is a diagram illustrating states of observing the lower opening $O_D$ of the small hole H of the workpiece W using the camera 34. In FIG. 17, the workpiece W is illustrated in cross section. The workpiece W illustrated in FIG. 17 has a different portion of the workpiece W arranged asymmetrically with respect to the center of the lower opening $O_D$ on the lower opening $O_D$ side of the small hole H. As a result, as illustrated in 217A of FIG. 17, the lower opening $O_D$ of the workpiece W has different reflected light quantities depending on the position, making it difficult to observe the lower opening $O_D$.

Further, the workpiece W illustrated in FIG. 17 has a small space on the lower opening $O_D$ side of the small hole H. Therefore, as illustrated in 217B of FIG. 17, the space for inserting the light source 70 is insufficient, and the light source 70 cannot be arranged on the lower opening $O_D$ side.

Further, as illustrated in 217C of FIG. 17, it is possible to insert the reflector 72 on the lower opening $O_D$ side. However, the small space on the lower opening $O_D$ side requires accurate positioning. Further, the reflector 72 may collide with the workpiece W and damage the workpiece W.

For such problems, a flexible reflector may be inserted on the lower opening $O_D$ side of the small hole H of the workpiece W to increase the light quantity in observing the lower opening $O_D$.

Figure 18:
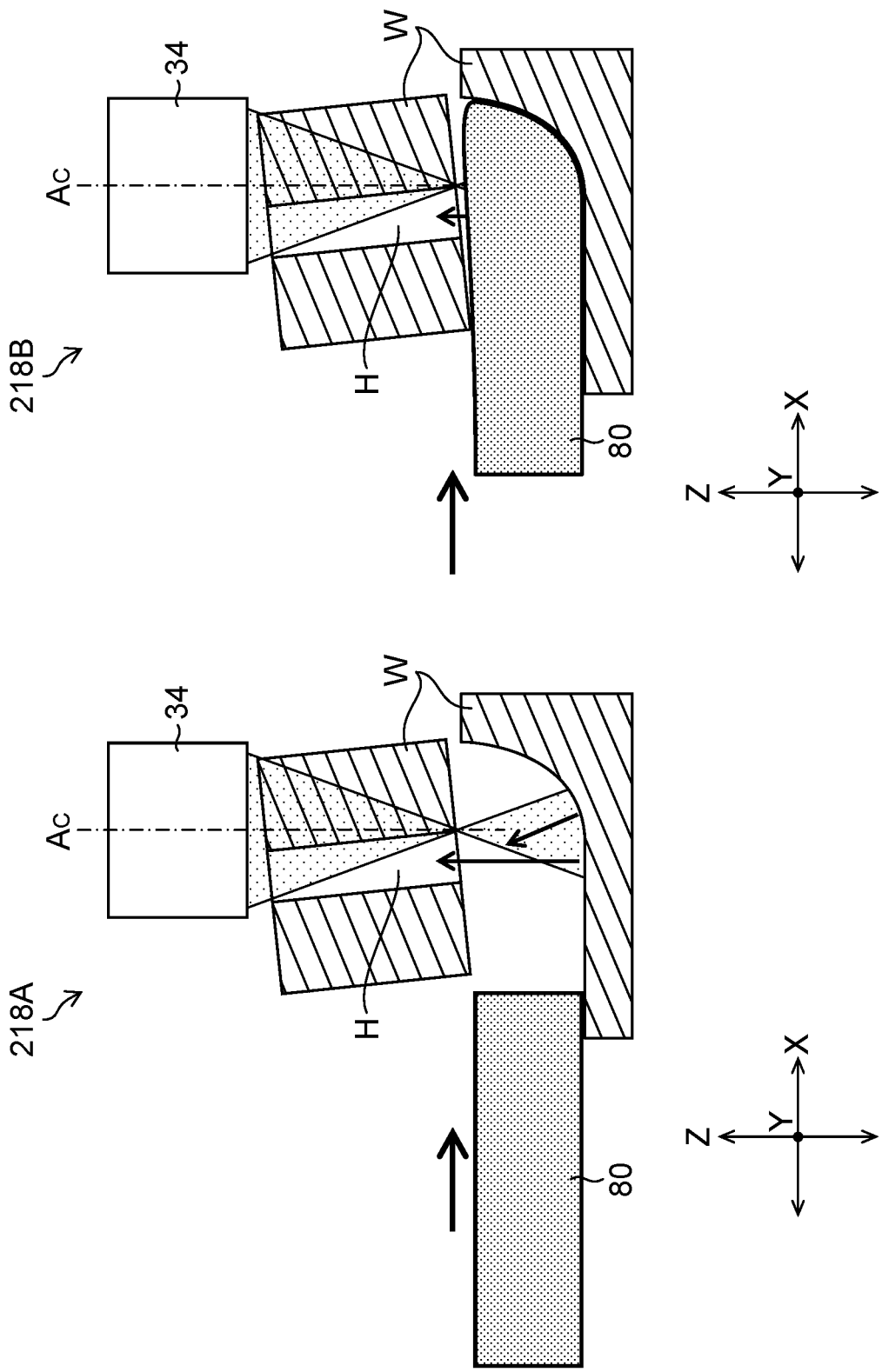
FIG. 18 is a diagram illustrating insertion of a sponge-like reflector into a lower opening side of a small hole in a workpiece.

FIG. 18 is a diagram illustrating the insertion of a sponge-like reflector 80 into the lower opening $O_D$ side of the small hole H of the workpiece W. In FIG. 18, the workpiece W is illustrated in cross section. In FIG. 18, 218A illustrates the sponge-like reflector 80 before insertion, and 218B illustrates the sponge-like reflector 80 after insertion.

The sponge-like reflector 80 is a light reflecting member having elasticity and flexibility. The sponge-like reflector 80 reflects the light, which is incident thereon from the upper opening $O_U$ of the small hole H (an example of an opening on the camera side), to the small hole H on the lower opening $O_D$ side (an example of a linear-and-tilting-motion stage side). The sponge-like reflector 80 desirably has a color such as white having a high reflectance of light. The sponge-like reflector 80 has flexibility, so that it can be inserted into a small space on the lower opening $O_D$ side.

Such a sponge-like reflector 80 is inserted into the lower opening $O_D$ side, and thereby can increase the light quantity in observing the lower opening $O_D$. This facilitates observing the lower opening $O_D$, and allows alignment with higher accuracy. Further, the sponge-like reflector 80 deforms along the shape of the workpiece W on the lower opening $O_D$ side. This does not require strict shaping or positioning, and has an effect of low cost. Further, the sponge-like reflector 80 has flexibility, so that it has an effect that there is no concern about damaging the workpiece W.

Figure 19:
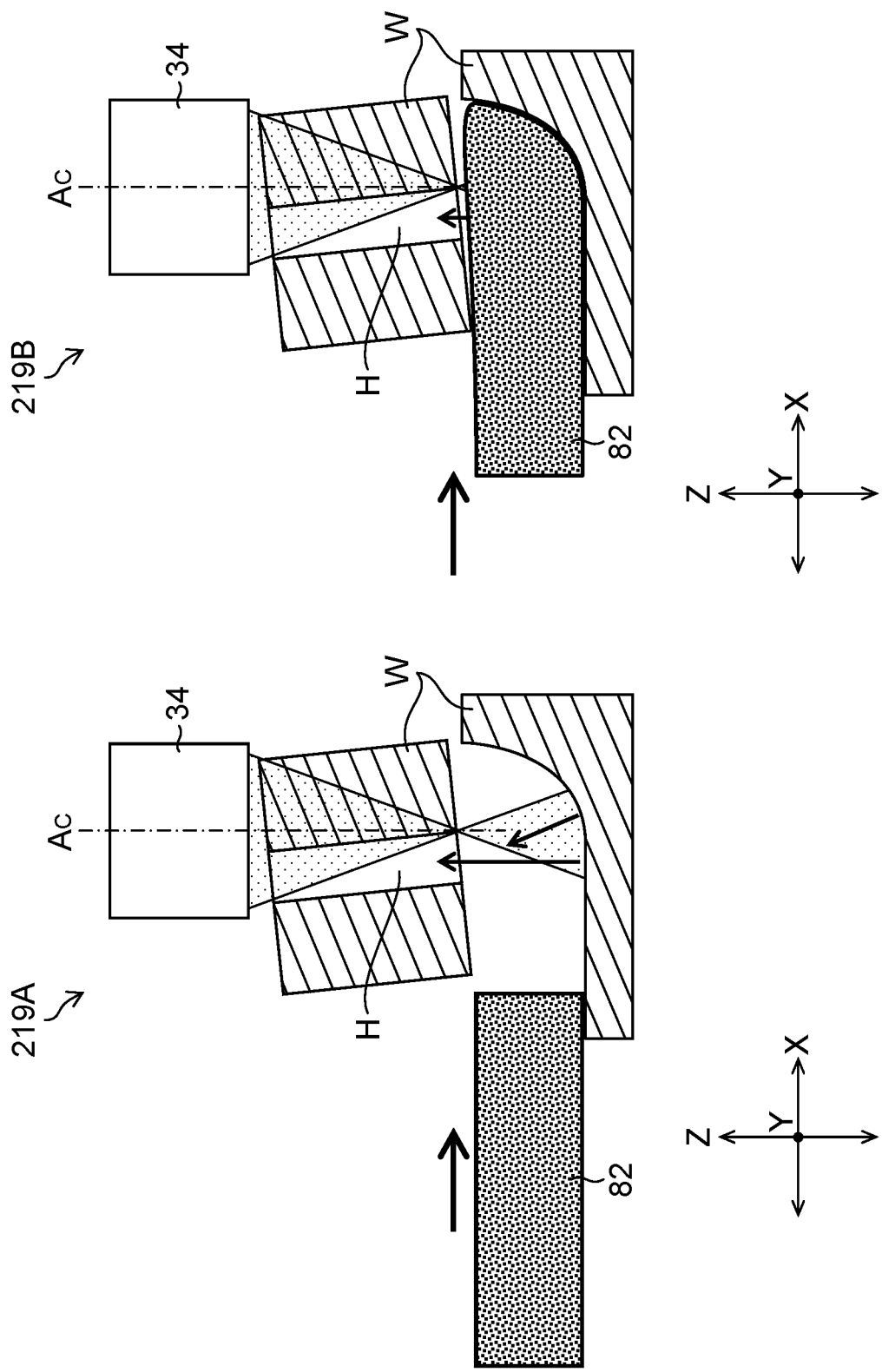
FIG. 19 is a diagram illustrating insertion of a clay-like reflector into the lower opening side of the small hole in the workpiece.

Further, FIG. 19 is a diagram illustrating insertion of a clay-like reflector 82 into the lower opening $O_D$ side of the small hole H of the workpiece W. In FIG. 19, the workpiece W is illustrated in cross section. In FIG. 19, 219A illustrates the clay-like reflector 82 before insertion, and 219B illustrates the clay-like reflector 82 after insertion.

The clay-like reflector 82 is a light reflecting member having plasticity and flexibility. The clay-like reflector 82 reflects the light, which is incident thereon from the upper opening $O_U$ of the small hole H (an example of an opening on the camera side), to the small hole H on the lower opening $O_D$ (an example of an opening on the linear-and-tilting-motion stage side). The clay-like reflector 82 desirably has a color such as white having a high reflectance of light. The clay-like reflector 82 has flexibility, so that it can be inserted into a small space on the lower opening $O_D$ side.

Such a clay-like reflector 82 is inserted into the lower opening $O_D$ side, and thereby can increase the light quantity in observing the lower opening $O_D$. This facilitates observing the lower opening $O_D$, and allows alignment with higher accuracy. Further, the clay-like reflector 82 deforms along the shape of the workpiece W on the lower opening $O_D$ side. This does not require strict shaping or positioning, and has an effect of low cost. Further, the clay-like reflector 82 has flexibility, so that it has an effect that there is no concern about damaging the workpiece W.

Further, FIG. 20 is a diagram illustrating insertion of a scatterer 84 into the lower opening $O_D$ side of the small hole H of the workpiece W. In FIG. 20, the workpiece W is illustrated in cross section. In FIG. 20, 220A illustrates the scatterer 84 before insertion, and 220B illustrates the scatterer 84 after insertion.

The scatterer 84 is a sponge having an open-cell structure having elasticity and flexibility. The scatterer 84 is arranged on the lower opening $O_D$ side of the small hole H (an example on a side opposite to the camera side). The scatterer 84 has flexibility, so that it can be inserted into a small space on the lower opening $O_D$ side. A light source 70 is attached to the scatterer 84. The light source 70 emits light incident on the scatterer 84. The light incident on the scatterer 84 from the light source 70 performs multiple scattering inside the scatterer 84 and is then incident on the lower opening $O_D$.

Arranging such a scatterer 84 on the lower opening $O_D$ side allows the scatterer 84 to form a surface light source due to multiple scattering. This can increase the light quantity in observing the lower opening $O_D$. This then facilitates observing the lower opening $O_D$, and allows alignment with higher accuracy. Further, the scatterer 84 deforms along the shape of the workpiece W on the lower opening $O_D$ side. This does not require strict shaping or positioning, and has an effect of low cost. Further, the scatterer 84 has flexibility, so that it has an effect that there is no concern about damaging the workpiece W.

Another Embodiment

The above embodiments describe examples of calculating the position and tilt of the small hole H every time when the inner surface shape of the workpiece W are measured. However, it is also possible that the position of the rotation axis $A_R$ of the rotating body 14 is registered in advance, and the workpiece W is aligned using the registered rotation center coordinates, which is also referred to as rotation center coordinates hereinafter (see FIG. 15).

Figure 21:
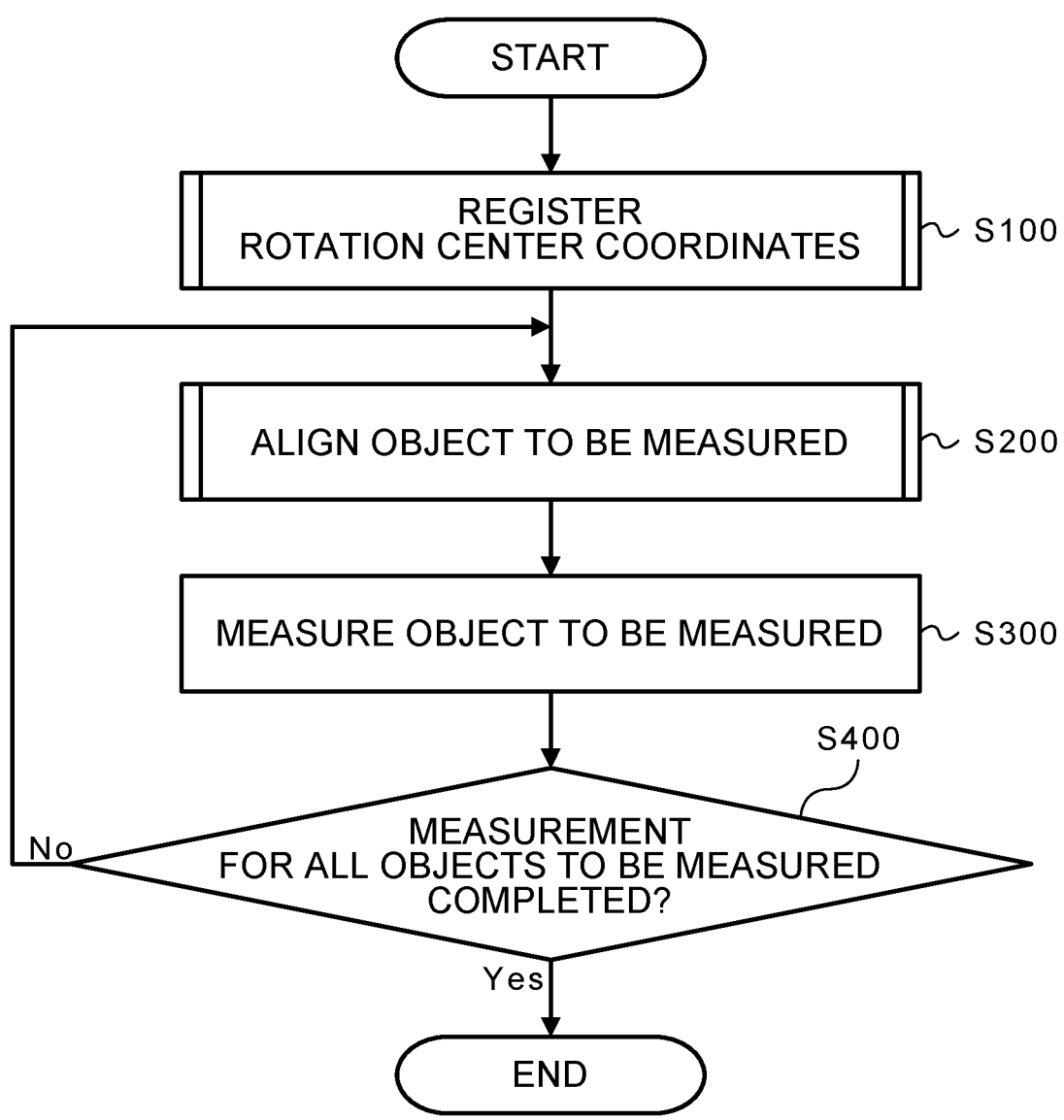
FIG. 21 is a flowchart illustrating processing of an alignment method for an inner surface shape measurement device according to another embodiment of the present invention.

FIG. 21 is a flowchart illustrating processing of an alignment method of an inner surface shape measurement device according to another embodiment of the present invention.

As illustrated in FIG. 21, in the present embodiment, the position (rotation center coordinates) of the rotation axis $A_R$ of the rotating body 14 is measured and registered using a reference workpiece $W_R$ (step S100).

Next, using the rotation center coordinates registered in step S100, the workpiece W, which is the object to be measured, is aligned (step S200), and the workpiece W is measured (step S300). Then, steps S200 to S300 are repeated until the measurement of all the workpieces W completes (step S400).

Figure 22:
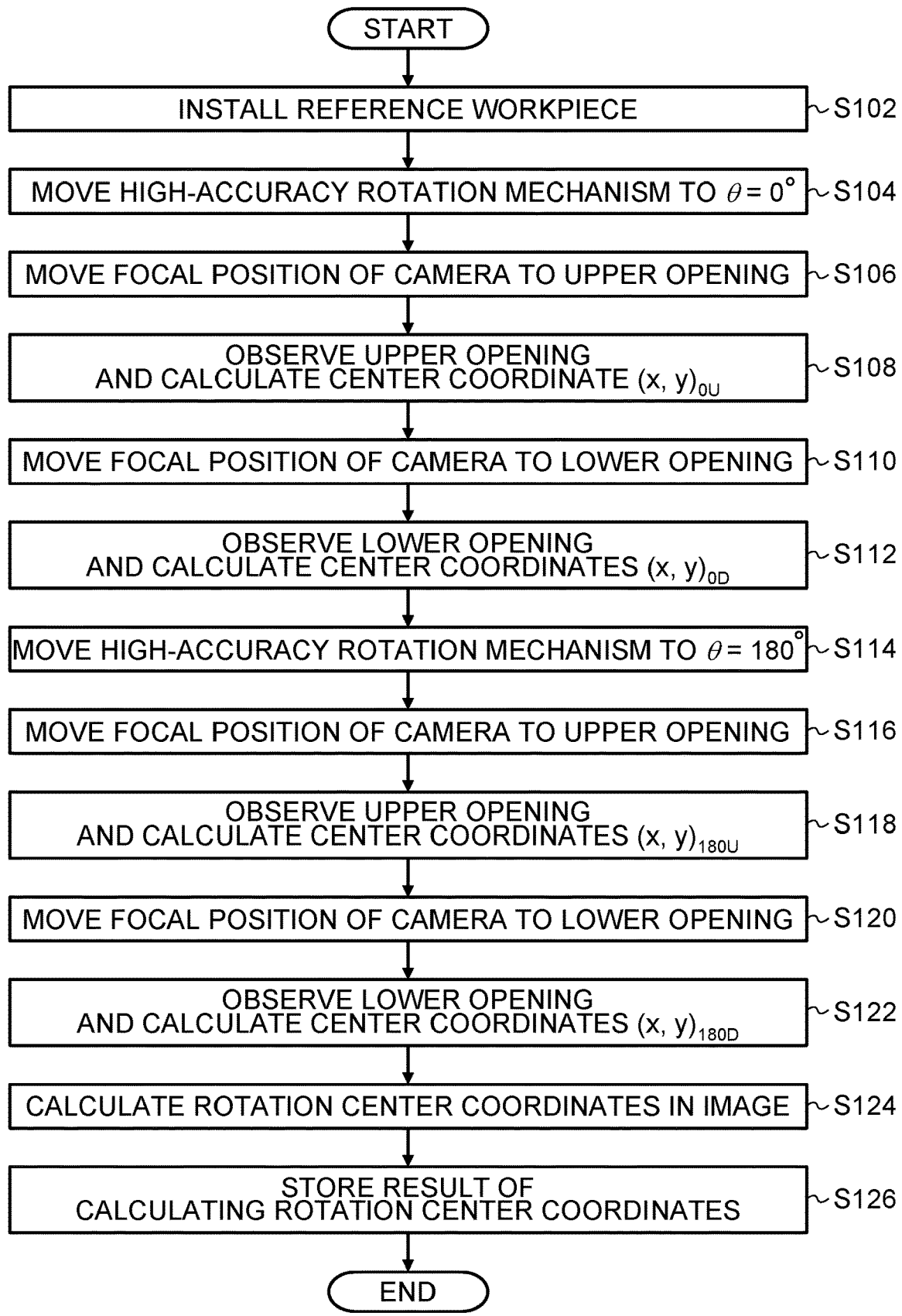
FIG. 22 is a flowchart illustrating steps of registering a position of rotation center coordinates.

The next describes the step of registering the position of the rotation center coordinates (step S100) in the present embodiment with reference to FIG. 22.

First, in step S102, the reference workpiece $W_R$ is installed on the workpiece installation jig 18. Here, the reference workpiece $W_R$ has a shape corresponding to a small hole (an example of a hole-shaped pattern, for example, a circle) like the workpiece W, which is an object to be measured, and is a workpiece whose shape (for example, the outer diameter dimension and the hole dimension) is accurately measured and known in advance. The reference workpiece $W_R$ to be used can be, for example, a workpiece made of the same material and having substantially the same shape as the workpiece, which is the object to be measured.

Next, in step S104, the measurement controller 52 drives the motor (not illustrated) according to the result detected by the encoder (not illustrated) of the rotating body 14, and moves (rotates) the rotating body 14 to a position where the rotation angle is the set angle $\theta=0°$ (an example of the first rotation angle).

In step S106, the measurement controller 52 drives the motor (not illustrated) of the arm 24 to move the camera 34 upward in the Z direction of the reference workpiece $W_R$. Further, the measurement controller 52 drives the motor (not illustrated) of the carriage 22 to move the camera 34 in the Z direction to align the focal position of the camera 34 with the upper opening $O_U$ of the small hole H (an example of the first position).

In the following step S108 (an example of a first observation control step), the observation controller 58 observes (images) the upper opening $O_U$ of the small hole H using the camera 34. Further, the position-and-tilt calculator 60 calculates the center coordinates $(x, y)_{0U}$ of the upper opening $O_U$ of the small hole H at the set angle $\theta=0°$.

Next, in step S110, the measurement controller 52 drives the motor (not illustrated) of the carriage 22 to move the camera 34 in the Z direction to align the focal position of the camera 34 with the lower opening $O_D$ (an example of the second position) whose position in the Z direction is different from that of the upper opening $O_{DU}$ of the small hole H.

In the following step S112 (an example of the first observation control step), the observation controller 58 observes the lower opening $O_D$ of the small hole H using the camera 34. Further, the position-and-tilt calculator 60 calculates the center coordinates $(x, y)_{0D}$ of the lower opening $O_D$ of the small hole H at the set angle $\theta=0°$.

Next, in step S114, the measurement controller 52 drives the motor (not illustrated) according to the result detected by the encoder (not illustrated) of the rotating body 14 to move the rotating body 14 to a position where the rotation angle is the set angle $\theta=180°$ (an example of a second rotation angle).

In step S116, the measurement controller 52 drives the motor (not illustrated) of the carriage 22 to move the camera 34 in the Z direction to align the focal position of the camera 34 with the upper opening $O_U$.

In the following step S118 (an example of the first observation control step), the observation controller 58 observes the upper opening $O_U$ of the small hole H using the camera 34. Further, the position-and-tilt calculator 60 calculates the center coordinates $(x, y)_{180U}$ of the upper opening $O_U$ of the small hole H at the set angle $\theta=180°$, from the image $I_{180U}$.

Next, in step S120, the measurement controller 52 drives the motor (not illustrated) of the carriage 22 to move the camera 34 in the Z direction to align the focal position of the camera 34 with the lower opening $O_D$ of the small hole H.

In the following step S122 (an example of the first observation control step), the observation controller 58 observes the lower opening $O_D$ of the small hole H using the camera 34. Further, the position-and-tilt calculator 60 calculates the center coordinates $(x, y)_{180D}$ of the lower opening $O_D$ of the small hole H at the set angle $\theta=180°$, from the image $I_{180D}$.

In step S124 (an example of a rotation center coordinate calculation step), the position-and-tilt calculator 60 calculates the position (rotation center coordinates) of the rotation axis $A_R$ of the rotating body 14, from the center coordinates $(x, y)_{0U}$ of the upper opening $O_U$ and the center coordinates $(x, y)_{0D}$ of the lower opening $O_D$ of the small hole H at the set angle $\theta=0°$, and the center coordinates $(x, y)_{180U}$ of the upper opening $O_U$ and the center coordinates $(x, y)_{180D}$ of the lower opening $O_D$ of the small hole H at the set angle $\theta=180°$. Then, in step S126, the position-and-tilt calculator 60 stores the rotation center coordinates calculated in step S124 in the storage of the controller 50.

Figure 23:
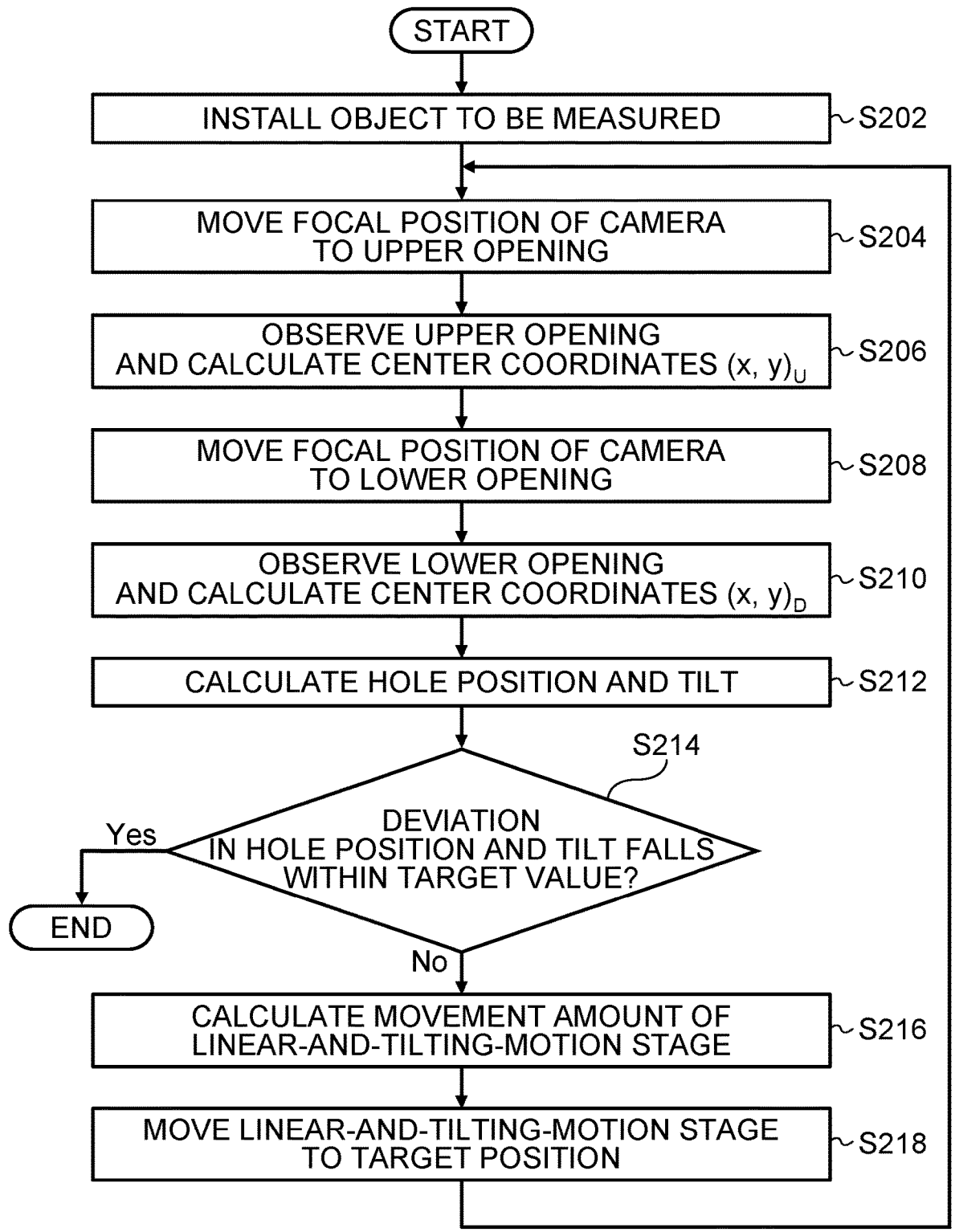
FIG. 23 is a flowchart illustrating alignment steps of a workpiece that is an object to be measured.

The next describes the alignment steps of the workpiece W, which is the object to be measured, with reference to FIG. 23.

First, in step S202, the workpiece W, which is the object to be measured, is installed on the workpiece installation jig 18.

In step S204, the measurement controller 52 drives the motor (not illustrated) of the arm 24 to move the camera 34 upward in the Z direction of the workpiece W. Further, the measurement controller 52 drives the motor (not illustrated) of the carriage 22 to move the camera 34 in the Z direction to align the focal position of the camera 34 with the upper opening $O_U$ of the small hole H (an example of a third position).

In the following step S206 (an example of a second observation control step), the observation controller 58 observes (images) the upper opening $O_U$ of the small hole H using the camera 34. Further, the position-and-tilt calculator 60 calculates the center coordinates $(x, y)_U$ of the upper opening $O_U$ of the small hole H.

Next, in step S208, the measurement controller 52 drives the motor (not illustrated) of the carriage 22 to move the camera 34 in the Z direction to align the focal position of the camera 34 with the lower opening $O_D$ (an example of a fourth position) whose position in the Z direction is different from that of the upper opening $O_{DU}$ of the small hole H.

In the following step S210 (an example of the second observation control step), the observation controller 58 observes the lower opening $O_D$ of the small hole H using the camera 34. Further, the position-and-tilt calculator 60 calculates the center coordinates $(x, y)_D$ of the lower opening $O_D$ of the small hole H.

In step S212 (an example of the position-and-tilt calculation step), first, the position-and-tilt calculator 60 calculates the position and tilt of the central axis $A_H$ of the small hole H of the workpiece W, from the center coordinates $(x, y)_U$ of the upper opening $O_U$ and the center coordinates $(x, y)_D$ of the lower opening $O_D$ of the small hole H, respectively calculated in steps S206 and S210. Next, the position-and-tilt calculator 60 reads out the position (rotation center coordinates) of the rotation axis $A_R$ of the rotating body 14 calculated in step S124 of FIG. 22, from the storage of the controller 50, and calculates the position and tilt of the central axis $A_H$ of the small hole H of the workpiece W with respect to the position (rotation center coordinates) of the rotation axis $A_R$ of the rotating body 14. Here, the position-and-tilt calculator 60 functions as a rotation center coordinate calculator.

In step S214, the position-and-tilt calculator 60 determines whether deviation of the position and tilt of the central axis $A_H$ of the small hole H of the workpiece W from the rotation axis $A_R$ is within the target value. If the deviation is larger than the target value, the controller 50 performs the processing of step S216. If the deviation is within the target value, the processing of this flowchart ends.

In step S216, the position-and-tilt calculator 60 calculates the movement amount of the linear-and-tilting-motion stage 16.

In step S218 (an example of a stage control step), the stage controller 62 drives the motor (not illustrated) of the linear-and-tilting-motion stage 16 based on the movement amount calculated in step S216, and moves the linear-and-tilting-motion stage 16 to the target position. After that, the process proceeds to step S204, and the controller 50 performs the same processing. The inner surface shape measurement device 10 repeats this processing, and thereby makes the deviation between the central axis $A_H$ of the small hole H of the workpiece W and the rotation axis $A_R$ of the rotating body 14 within the target value.

The present embodiment does not require the rotating body 14 to be operated every time when the workpiece W, which is the object to be measured, is aligned (see FIG. 23). Therefore, the alignment of the workpiece W can complete in a short time.

In general, the driving operation, which makes the deviation between the central axis $A_H$ of the small hole H of the workpiece W and the rotation axis $A_R$ of the rotating body 14 within the target value, requires a plurality of repetitions (see FIGS. 4 and 23). As the alignment target accuracy is higher (the deviation target value is smaller), the number of repetitions tends to increase.

In the present embodiment, the driving operation does not include the operation of the rotating body 14, enabling the required time to reduce greatly.

As a specific example, N represents the number of repetitions of the driving operation, and N=4 times on average is assumed in one example. Further, t1 represents the time required for the rotation operation of the rotating body 14 (rotation operation from θ=0° to θ=180°) in one driving operation. When the rotation operation of the rotating body 14 is assumed to take 30 seconds for each of the upper opening and the lower opening in one example, t1=30 seconds×2=60 seconds. Then, t2 represents the time required for up and down positioning of the focal position of the camera, imaging, and axis movement. In one example, t2=30 seconds is assumed. Then, T1 represents the time required for alignment when the driving operation includes the movement of the rotating body 14 (FIG. 4), and T2 represents the time required for alignment when the driving operation does not include it (FIG. 23). In this case, T1 and T2 are expressed as follows:

$T1=(t1+t2)*N=(60+30)*4=360$ seconds $T2=t2*N=30*4=120$ seconds

In the above specific example, when the driving operation does not include the movement of the rotating body 14, the required time for aligning the workpiece W can be dramatically reduced to ⅓ as compared with the case in which the driving operation includes the movement.

Further, according to the present embodiment, the shape and dimensions of the reference workpiece $W_R$ are known, so that the rotation center coordinates can be obtained with high accuracy. In general, the hole of the workpiece W, which is the object to be measured, is not limited to a circular shape, and may be a distorted circular shape such as an ellipse, or a shape having a projection inside. In calculating the rotation center coordinates in the image based on the shape of the small hole of the workpiece W, which is the object to be measured, it may be difficult to calculate the rotation center with high accuracy due to the effect of the shape of the small hole of the workpiece W.

Figure 24:
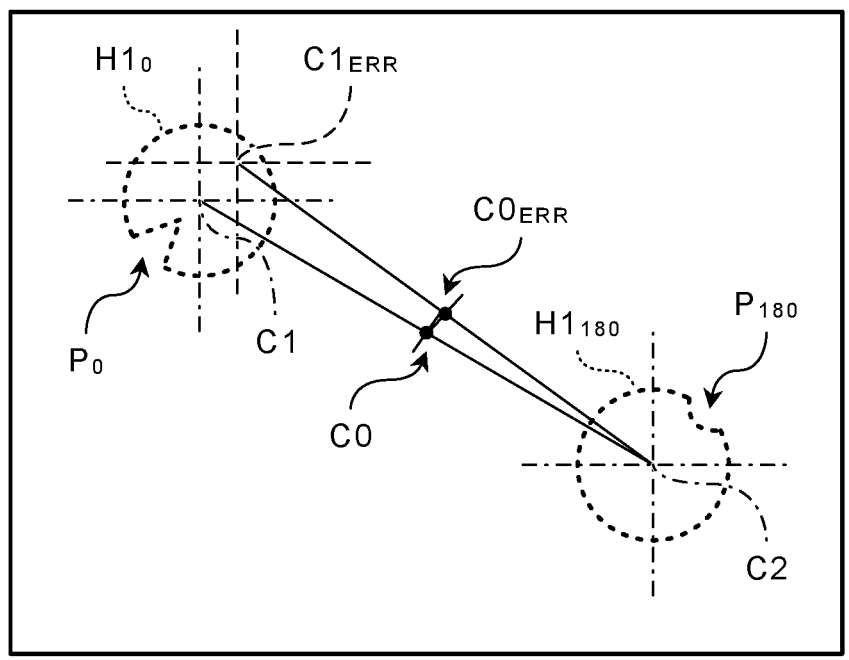
FIG. 24 is a plan view illustrating an example of calculating rotation center coordinates when a small hole of a workpiece has a shape having a projection inside.
Figure 25:
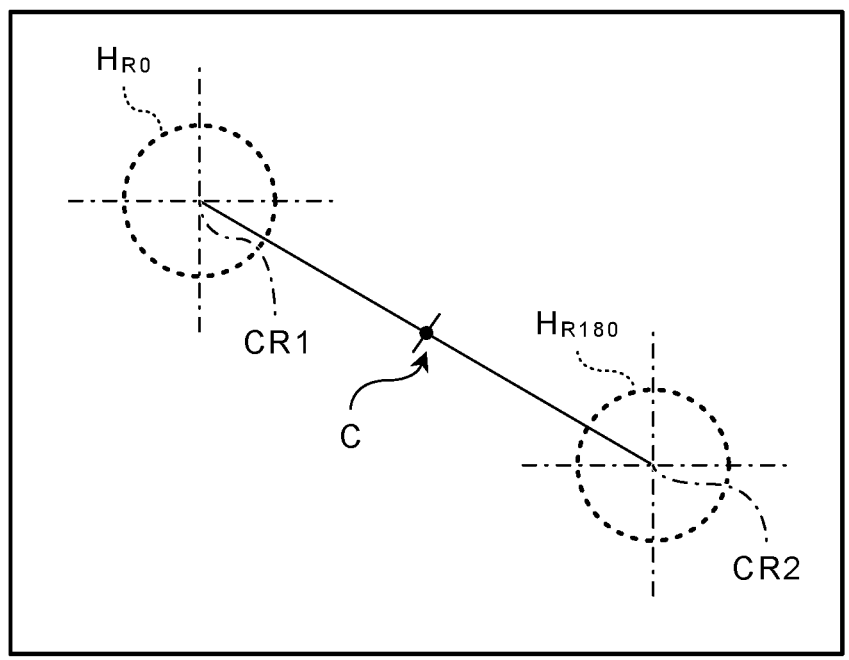
FIG. 25 is a plan view illustrating an example of calculating rotation center coordinates using a reference workpiece.

FIG. 24 is a plan view illustrating an example of calculating the rotation center coordinates when the small hole H of the workpiece W has a shape having a projection inside, and FIG. 25 is a plan view illustrating an example of calculating the rotation center coordinates using the reference workpiece $W_R$.

In the example illustrated in FIG. 24, when θ=0°, the projection portion $P_0$ of the small hole $H1_0$ is clearly visible. Therefore, the center position of the small hole $H1_0$ is detected to be a position $C1_{ERR}$ deviating from the true position C1 to the opposite side of the projection portion $P_0$. On the other hand, when θ=180°, the projection portion $P_{180}$ of the small hole $H1_{180}$ is flattened due to the effect of lighting or the like. Therefore, the center position of the small hole $H1_{180}$ is detected to be a position C2 which substantially coincides with the center of the circle. Therefore, in this example, the rotation center coordinates are detected to be a position $C0_{ERR}$ deviating from the true position C0.

On the other hand, in the example illustrated in FIG. 25, both the small holes $H_{R0}$ and $H_{R180}$ have known perfect circular shapes in both cases of θ=0° and θ=180°, so that the shape of the small hole can be detected without receiving effect of lighting or the like. This makes it possible to accurately detect the center CR1 of the small hole $H_{R0}$ and the center CR2 of the small hole $H_{R180}$, and to improve the calculation accuracy of the rotation center coordinates C. This also makes it possible to measure shape information such as the circular diameter of the small hole of the reference workpiece $W_R$ in advance and detect small holes and calculate the center coordinates using the shape information, to calculate the rotation center coordinates C with higher accuracy.

(About Reference Workpiece $W_R$)

Note that, in the above-described another embodiment, the reference workpiece $W_R$ to be used is a workpiece W having a three-dimensional shape with the same small hole as the workpiece W, which is the object to be measured, but the present invention is not limited to this. For example, the reference workpiece $W_R$ to be used may have a plane shape. The plane-shaped reference workpiece $W_R$ may be formed with a pattern with a black circle in the center (an example of a hole-shaped pattern) corresponding to a small hole. This makes it possible to share the program for searching and calculating the position of the small hole with the above embodiment. Further, the reference workpiece $W_R$ in a plane shape may have a print pattern for positioning (reticle, an example of a hole-shaped pattern) printed thereon (see a plane-shaped reference workpiece $W_{R1}$ in FIG. 26). The print pattern for positioning may be formed with a pattern indicating the center position of the small hole. This makes it possible to calculate the coordinates of the center of rotation and the like with high accuracy.

Figure 26:
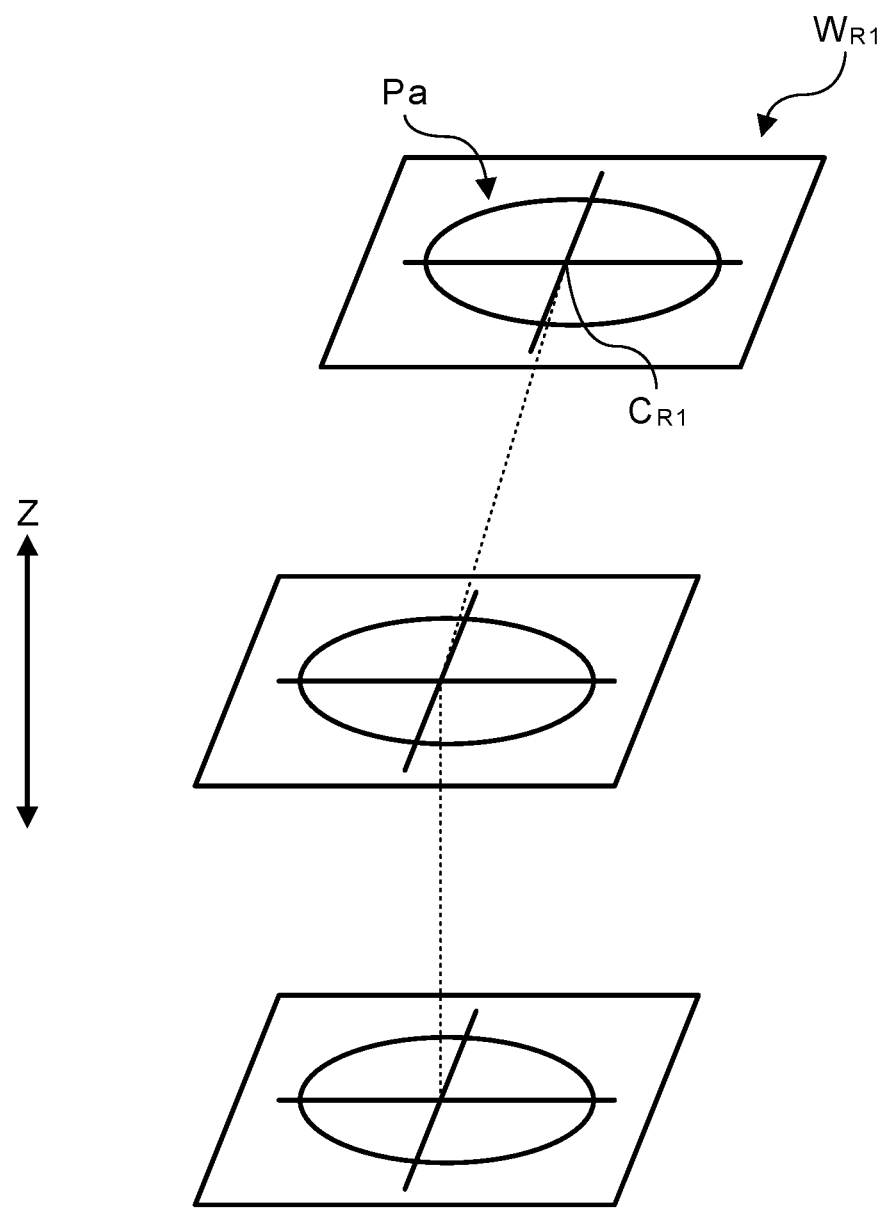
FIG. 26 is a diagram illustrating an example of a reference workpiece having a plane shape.

Further, when a plane-shaped reference workpiece is used, it can be used in combination with a mechanism for moving the reference workpiece up and down in the Z direction. In this case, as illustrated in FIG. 26, the plane-shaped reference workpiece $W_{R1}$ is moved up and down in the Z direction, so that the rotation center coordinates are calculated based on the center CR1 of the reticle (pattern Pa) for each position in the Z direction. As a result, the tilt of the rotation axis can be calculated and registered in advance, so that alignment can be performed with higher accuracy.

Note that, when a reference workpiece $W_R$ to be used has a three-dimensional shape (hole shape), as described above, it is possible to share a program for searching and calculating the position of a small hole with the case of using the reference workpiece $W_R$ of the plane shape. Further, it is possible to register the rotation center for each of the upper opening and the lower opening, and thereby calculate and register the tilt of the rotation axis in advance.

Further, the reference workpiece $W_R$ to be used can be a workpiece W that is an object to be measured made with high accuracy, or an object having a shape similar to the workpiece W. In this case, the gripping mechanism of the workpiece W, which is the object to be measured, can be applied for gripping the reference workpiece $W_R$.

<Others>

The technical scope of the present invention is not limited to the scope described in the above embodiment. The configurations and the like in the individual embodiments can be appropriately combined among the embodiments without departing from the spirit of the present invention.

REFERENCE SIGNS LIST

10 . . . inner surface shape measurement device, 12 . . . main body base, 14 . . . rotating body, 16 . . . linear-and-tilting-motion stage, 18 . . . workpiece installation jig, 20 . . . column, 22 . . . carriage, 24 . . . arm, 28 . . . displacement detector, 30 . . . probe, 34 . . . camera, 35 . . . coaxial epi-illumination optical system, 38 . . . optical fiber, 40 . . . reflective mirror, 42 . . . contactor, 50 . . . controller, 52 . . . measurement controller, 54 . . . displacement acquisition unit, 56 . . . roundness calculator, 58 . . . observation controller, 60 . . . position-and-tilt calculator, 62 . . . stage controller, 63 . . . output unit, 70 . . . light source, 72 . . . reflector, 80 . . . sponge-like reflector, 82 . . . clay-like reflector, 84 . . . scatterer, $A_H$ . . . central axis, $A_R$ . . . rotation axis, $F_D$ . . . focal plane, $F_U$ . . . focal plane, H . . . small hole, $I_{0D}$ . . . image, $I_{0U}$ . . . image, $I_{180D}$ . . . image, $I_{180U}$ . . . image, $O_D$ . . . lower opening, $O_U$ . . . upper opening, P . . . optical path, R . . . imaging range, S1 to S14 . . . each step of the processing of the alignment method of the inner surface shape measurement device, $T_U$ . . . trajectory of the center coordinates of the upper opening, W workpiece, and $W_R$, $W_{R1}$ . . . reference workpiece

What is claimed is:

1. An inner surface shape measurement device, comprising:
   a rotating body configured to rotate around a rotation axis parallel to a first direction;
   a linear-and-tilting-motion stage supported by the rotating body, the linear-and-tilting-motion stage being capable of changing a position thereof and a tilt thereof, the position being a position in a flat surface with respect to the rotating body, the tilt being a tilt with respect to the flat surface, the flat surface being orthogonal to the first direction;
   a displacement detector configured to detect displacement of an inner side surface of a hole of a workpiece, using a probe capable of being moved in the first direction by a first linear-motion mechanism, the workpiece being fixed to the linear-and-tilting-motion stage and rotating together with the rotating body, the probe being a contact probe or a non-contact probe each extending parallel to the first direction;
   a camera having an optical axis parallel to the first direction;
   an observation controller configured to observe, using the camera: a first position and a second position of the hole of the workpiece at a first rotation angle of the rotating body; and the first position and the second position of the hole of the workpiece at a second rotation angle of the rotating body, the second position being a position different from the first position in the first direction, the second rotation angle being an angle different from the first rotation angle;
   a position-and-tilt calculator configured to calculate a position and a tilt of the hole from coordinates of the observed first position and the observed second position of the hole at the first rotation angle of the rotating body, and from coordinates of the observed first position and the observed second position of the hole at the second rotation angle of the rotating body; and
   an output unit configured to output hole information including the calculated position and tilt of the hole.

2. The inner surface shape measurement device according to claim 1, further comprising a stage controller configured to control the linear-and-tilting-motion stage based on the hole information, and make a deviation between a central axis of the hole and the rotation axis within a target value.

3. The inner surface shape measurement device according to claim 1, wherein
   the camera can be moved in the first direction by the first linear-motion mechanism, and
   the observation controller moves a focal position of the camera to the first position and the second position of the hole, using the first linear-motion mechanism.

4. The inner surface shape measurement device according to claim 1, wherein the first rotation angle and the second rotation angle are 180° different from each other.

5. The inner surface shape measurement device according to claim 1, further comprising a coaxial illumination optical system configured to emit light coaxial with an optical axis of the camera.

6. The inner surface shape measurement device according to claim 1, further comprising a sponge-like reflector or a clay-like reflector,
   wherein the reflector reflects light, incident on an opening on a side of the camera of the hole of the workpiece, to the hole from a side of the linear-and-tilting-motion stage, the workpiece being arranged between the camera and the linear-and-tilting-motion stage.

7. The inner surface shape measurement device according to claim 1, further comprising:
   an open-cell structure having flexibility; and
   a light source configured to make light incident on the open-cell structure,
   wherein the open-cell structure makes light from the light source incident on the opening on a side of the linear-and-tilting-motion stage of the hole of the workpiece arranged between the camera and the linear-and-tilting-motion stage.

8. The inner surface shape measurement device according to claim 1, wherein the hole has an inner diameter of 500 μm or less.

9. An inner surface shape measurement device, comprising:
   a rotating body configured to rotate around a rotation axis parallel to a first direction;
   a linear-and-tilting-motion stage supported by the rotating body, the linear-and-tilting-motion stage being capable of changing a position thereof and a tilt thereof, the position being a position in a flat surface with respect to the rotating body, the tilt being a tilt with respect to the flat surface, the flat surface being orthogonal to the first direction;
   a displacement detector configured to detect displacement of an inner side surface of a hole of a workpiece, using a probe capable of being moved in the first direction by a first linear-motion mechanism, the workpiece being fixed to the linear-and-tilting-motion stage and rotating together with the rotating body, the probe being a contact probe or a non-contact probe each extending parallel to the first direction;

a camera having an optical axis parallel to the first direction;

a first observation controller configured to observe, using the camera: a first position and a second position of a hole-shaped pattern of a reference workpiece at a first rotation angle of the rotating body; and the first position and the second position of the hole-shaped pattern of the reference workpiece at a second rotation angle of the rotating body, the second position being a position different from the first position in the first direction, the reference workpiece being fixed to the linear-and-tilting-motion stage, the reference workpiece being formed with the hole-shaped pattern and having a known shape, the second rotation angle being an angle different from the first rotation angle;

a rotation center coordinate calculator configured to calculate rotation center coordinates of the rotating body from coordinates of the observed first position and the observed second position of the hole at the first rotation angle of the rotating body, and from coordinates of the observed first position and the observed second position of the hole at the second rotation angle of the rotating body;

a second observation controller configured to observe a third position and a fourth position of the hole of a workpiece to be measured, using a camera having an optical axis parallel to the first direction, the fourth position being different from the third position in the first direction, the workpiece to be measured being fixed to the linear-and-tilting-motion stage; and a position-and-tilt calculator configured to calculate a position and a tilt of the hole from rotation center coordinates of the rotating body, and from the third position and the fourth position of the hole.

10. The inner surface shape measurement device according to claim 9, further comprising a stage controller configured to control the linear-and-tilting-motion stage based on hole information including a position and a tilt of the hole, and make deviation between a central axis of the hole and the rotation axis within a target value.

11. The inner surface shape measurement device according to claim 9, wherein
the camera can be moved in the first direction by the first linear-motion mechanism, and
the second observation controller moves a focal position of the camera to the third position and the fourth position of the hole, using the first linear-motion mechanism.

12. The inner surface shape measurement device according to claim 9, wherein the first rotation angle and the second rotation angle are 180° different from each other.

13. The inner surface shape measurement device according to claim 9, further comprising a coaxial illumination optical system configured to emit light coaxial with an optical axis of the camera.

14. The inner surface shape measurement device according to claim 9, further comprising a sponge-like reflector or a clay-like reflector,
wherein the reflector reflects light, incident on an opening on a side of the camera of the hole of the workpiece, to the hole from a side of the linear-and-tilting-motion stage, the workpiece being arranged between the camera and the linear-and-tilting-motion stage.

15. The inner surface shape measurement device according to claim 9, further comprising:
an open-cell structure having flexibility; and
a light source configured to make light incident on the open-cell structure,
wherein the open-cell structure makes light from the light source incident on the opening on a side of the linear-and-tilting-motion stage of the hole of the workpiece arranged between the camera and the linear-and-tilting-motion stage.

16. The inner surface shape measurement device according to claim 9, wherein the hole has an inner diameter of 500 µm or less.

17. An alignment method for an inner surface shape measurement device, the inner surface shape measurement device including:
a rotating body configured to rotate around a rotation axis parallel to a first direction;
a linear-and-tilting-motion stage supported by the rotating body, the linear-and-tilting-motion stage being capable of changing a position thereof and a tilt thereof, the position being a position in a flat surface with respect to the rotating body, the tilt being a tilt with respect to the flat surface, the flat surface being orthogonal to the first direction; and
a displacement detector configured detect displacement of an inner side surface of a hole of a workpiece, using a probe capable of being moved in the first direction by a first linear-motion mechanism, the workpiece being fixed to the linear-and-tilting-motion stage and rotating together with the rotating body, the probe being a contact probe or a non-contact probe each extending parallel to the first direction,
the alignment method comprising:
an observation control step of observing, using a camera having an optical axis parallel to the first direction: a first position and a second position of the hole of the workpiece at a first rotation angle of the rotating body; and the first position and the second position of the hole of the workpiece at a second rotation angle of the rotating body, the second position being a position different from the first position in the first direction, the second rotation angle being an angle different from the first rotation angle;
a position-and-tilt calculation step of calculating a position and a tilt of the hole from coordinates of the observed first position and the observed second position of the hole at the first rotation angle of the rotating body, and from coordinates of the observed first position and the observed second position of the hole at the second rotation angle of the rotating body; and
an output step of outputting hole information including the calculated position and tilt of the hole.

18. The alignment method according to claim 17, wherein the hole has an inner diameter of 500 µm or less.

19. An alignment method for an inner surface shape measurement device, the inner surface shape measurement device including:
a rotating body configured to rotate around a rotation axis parallel to a first direction;
a linear-and-tilting-motion stage supported by the rotating body, the linear-and-tilting-motion stage being capable of changing a position thereof and a tilt thereof, the position being a position in a flat surface with respect to the rotating body, the tilt being a tilt with respect to the flat surface, the flat surface being orthogonal to the first direction; and a displacement detector configured to detect displacement of an inner side surface of a hole of a workpiece to be measured, using a probe capable of being moved in the first direction by a first linear-motion mechanism, the workpiece being fixed to the linear-and-tilting-motion stage and rotating together with the rotating body, the probe being a contact probe or a non-contact probe each extending parallel to the first direction, the alignment method comprising:

a first observation control step of fixing a reference workpiece to the linear-and-tilting-motion stage, and of observing, using a camera having an optical axis parallel to the first direction: a first position and a second position of a hole-shaped pattern of the reference workpiece at a first rotation angle of the rotating body; and the first position and the second position of the hole-shaped pattern of the reference workpiece at a second rotation angle of the rotating body, the second position being a position different from the first position in the first direction, the reference workpiece being formed with the hole-shaped pattern and having a known shape, the second rotation angle being an angle different from the first rotation angle;

a rotation center coordinate calculation step of calculating rotation center coordinates of the rotating body from coordinates of the observed first position and the observed second position of the hole at the first rotation angle of the rotating body, and from coordinates of the observed first position and the observed second position of the hole at the second rotation angle of the rotating body;

a second observation control step of fixing the workpiece to be measured to the linear-and-tilting-motion stage, and of observing a third position and a fourth position of the hole of the workpiece to be measured, using a camera having an optical axis parallel to the first direction, the fourth position being different from the third position in the first direction; and a position-and-tilt calculation step of calculating a position and a tilt of the hole from rotation center coordinates of the rotating body, and from the third position and the fourth position of the hole of the rotating body.

20. The alignment method according to claim 19, wherein the hole has an inner diameter of 500 µm or less.

* * * * *